(12) United States Patent
Hong

(10) Patent No.: US 7,539,949 B2
(45) Date of Patent: May 26, 2009

(54) METHOD OF SEARCHING IMAGES STORED IN DIGITAL STORAGE DEVICE

(75) Inventor: Suk-kyu Hong, Yongin-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 440 days.

(21) Appl. No.: 11/074,045

(22) Filed: Mar. 7, 2005

(65) Prior Publication Data

US 2006/0097988 A1   May 11, 2006

(30) Foreign Application Priority Data

Nov. 10, 2004   (KR) ...................... 10-2004-0091452

(51) Int. Cl.
*G06F 9/00*   (2006.01)
(52) U.S. Cl. ...................... 715/838; 715/854
(58) Field of Classification Search ................ 715/838, 715/864, 841; 345/168
See application file for complete search history.

(56) References Cited

U.S. PATENT DOCUMENTS

| | | | | |
|---|---|---|---|---|
| 5,903,309 | A * | 5/1999 | Anderson | 348/333.02 |
| 6,097,431 | A * | 8/2000 | Anderson et al. | 348/231.7 |
| 6,118,480 | A * | 9/2000 | Anderson et al. | 348/207.99 |
| 6,215,523 | B1 * | 4/2001 | Anderson | 348/333.05 |
| 6,249,316 | B1 * | 6/2001 | Anderson | 348/333.05 |
| 6,310,648 | B1 * | 10/2001 | Miller et al. | 348/333.05 |
| 6,317,141 | B1 * | 11/2001 | Pavley et al. | 715/732 |
| 6,538,698 | B1 * | 3/2003 | Anderson | 348/333.05 |
| 6,680,749 | B1 * | 1/2004 | Anderson et al. | 348/231.99 |
| 6,700,612 | B1 * | 3/2004 | Anderson et al. | 348/333.11 |
| 2005/0050043 | A1 * | 3/2005 | Pyhalammi et al. | 707/6 |

FOREIGN PATENT DOCUMENTS

| | | |
|---|---|---|
| JP | 2001-230992 A | 8/2001 |
| JP | 2002-152662 A | 5/2002 |
| JP | 2004-120225 A | 4/2004 |

OTHER PUBLICATIONS

Office Action established for CN 200510065174.7 (Dec. 14, 2007).

* cited by examiner

*Primary Examiner*—Doug Hutton
*Assistant Examiner*—Daeho D Song
(74) *Attorney, Agent, or Firm*—Drinker Biddle & Reath LLP

(57) ABSTRACT

Provided is a method of searching images stored in a digital storage device. The method includes: categorizing photographed images into a plurality of categories according to their characteristics; displaying a predetermined number of thumbnail images on a monitor of the digital storage device; and displaying thumbnail images on a different page within the same category on the monitor if a first signal is received, or displaying thumbnail images of a different category on the monitor if a second signal is received. Thus, the user may quickly and easily find a desired image among hundreds of images stored in the digital storage device.

12 Claims, 19 Drawing Sheets

FIG. 12

| | 130 | 1211 | |
|---|---|---|---|
| SEE REPRESENTATIVE IMAGE | | | SEE |
| BASIC CATEGORIZATION | | | REVERSE CHRONOLOGICAL ORDER |
| CATEGORIZE BY YEAR | | | REVERSE CHRONOLOGICAL ORDER |
| CATEGORIZE BY MONTH | | | REVERSE CHRONOLOGICAL ORDER |
| CATEGORIZE BY DAY | | | REVERSE CHRONOLOGICAL ORDER |
| CATEGORIZE BY TIME | | | REVERSE CHRONOLOGICAL ORDER |
| CATEGORIZE BY QUALITY OF PHOTOS | | | REVERSE CHRONOLOGICAL ORDER |
| CATEGORIZE BY RESOLUTIONS | | | REVERSE CHRONOLOGICAL ORDER |
| CATEGORIZE BY PHOTOGRAPH MODE TYPES | | | LANDSCAPE |
| CATEGORIZE BY PHOTOS TAKEN WITH FLASH | | | FLASH "ON" |
| CATEGORIZE BY FILE TYPES | | | JPG FILE |

METHOD OF SEARCHING IMAGES STORED IN DIGITAL STORAGE DEVICE

CROSS-REFERENCE TO RELATED PATENT APPLICATIONS

This application claims the priority of Korean Patent Application No. 10-2004-0091452, filed on Nov. 10, 2004 in the Korean Intellectual Property Office, the disclosure of which are incorporated herein in its entirety by reference.

BACKGROUND OF THE INVENTION

1. Field of the Invention

The present invention relates to a digital storage device, and more particularly, to a method of quickly searching images stored in categories in a digital storage device.

2. Description of the Related Art

Digital storage devices change photographed images into digital data and store the digital data in a memory. Hundreds of images may be photographed without using a film, and even more images may be stored using external memory devices such as a memory chip or a floppy disc. In addition, the images stored in the digital storage devices can be seen on a monitor without having to go through processes such as development, printing, or enlargement as for general cameras. Therefore, the digital storage devices are rapidly becoming popular with the general public.

However, the digital storage devices store the photographed images in the order they are photographed. Thus, in order for a user to find a desired image, the user has to go through all the images one by one.

As such, it is difficult to find a desired image among photographed images in a conventional digital camera. Furthermore, if a memory capacity of the digital camera is large and there are a lot of images stored in the memory, it takes more time and efforts to find a desired image.

SUMMARY OF THE INVENTION

The present invention provides a method of searching images stored in a digital storage device that allows a quick search for an image desired by a user among numerous images stored in the digital storage device.

According to an aspect of the present invention, there is provided a method of searching images stored in a digital storage device, including: categorizing photographed images into a plurality of categories according to their characteristics; displaying a predetermined number of thumbnail images on a monitor of the digital storage device; and displaying thumbnail images on a different screen within the same category on the monitor if a first signal is input, or displaying thumbnail images of a different category on the monitor if a second signal is input.

According to another aspect of the present invention, there is provided a method of searching images stored in a digital storage device, which includes an up button, a down button, a left button, a right button, a first hot button, and a second hot button and stores photographed images in a plurality of categories according to the characteristics of the photographed images. The method includes: entering into an index mode; displaying a predetermined number of thumbnail images on a monitor of the digital storage device; and moving a cursor displayed on the monitor to a next screen within the same image categorizing item when the down button and the first hot button are simultaneously pressed, or moving the cursor to a next image categorizing item when the down button and the second hot button are simultaneously pressed.

According to another aspect of the present invention, there is provided a method of searching images stored in a digital storage device, which includes an up button, a down button, a left button, and a right button and stores photographed images in a plurality of categories according to the characteristics of the photographed images. The method includes: entering into an index mode; displaying a predetermined number of thumbnail images on a monitor of the digital storage device; and moving a cursor displayed on the monitor to a next screen within the same image categorizing item when the down button is consecutively pressed twice, or moving the cursor to a next image categorizing item when the down button is consecutively pressed three times.

According to another aspect of the present invention, there is provided a method of searching images stored in a digital storage device, which includes an up button, a down button, a left button, a right button, and a hot button and stores photographed images in a plurality of categories according to the characteristics of the photographed images. The method includes: entering into an index mode; displaying a predetermined number of thumbnail images on a monitor of the digital storage device; and moving a cursor displayed on the monitor to a next screen within the same image categorizing item when the hot button pressed once, or moving the cursor to a next image categorizing item when the hot button is consecutively pressed twice.

BRIEF DESCRIPTION OF THE DRAWINGS

The above and other features and advantages of the present invention will become more apparent by describing in detail exemplary embodiments thereof with reference to the attached drawings in which:

FIG. 12 is a view of an image categorizing menu displayed on a monitor of digital storage devices illustrated in FIGS. 1 through 3;

DETAILED DESCRIPTION OF THE INVENTION

Figure 1A:
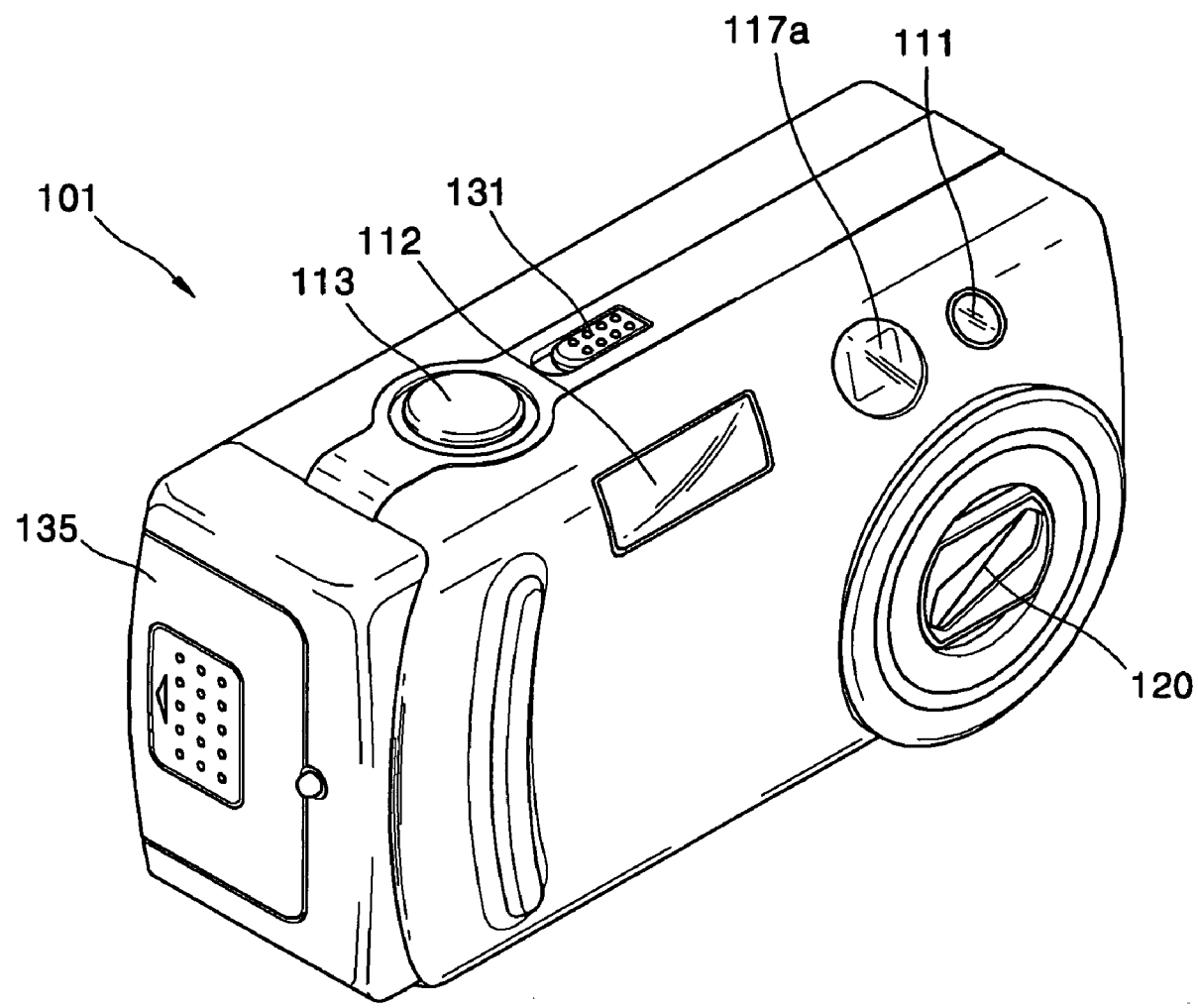
FIG. 1A is a front perspective view of a digital camera according to an embodiment of the present invention.

The present invention will now be described more fully with reference to the accompanying drawings, in which exemplary embodiments of the invention are shown. Like reference numerals in the drawings denote like elements.

FIG. 1A is a front perspective view of a digital storage device embodied as a digital camera 101. Referring to FIG. 1, the digital camera 101 includes on its front surface, a self-timer lamp 111, a flash 112, a view finder 117a, and a lens unit 120; on its top surface, a shutter release button 113, and a power switch 131; and on its side, a battery/memory card inserting area 135.

In a self-timer mode, the self-timer lamp 111 operates for a predetermined period of time from a time when the shutter release button 113 is pressed until time when an image starts to be captured.

The shutter release button 113 has a two-step structure. That is, if the shutter release button 113 is pressed to a first step a S1 signal output from the shutter release button 113 is turned "on", and if the shutter release button 113 is further pressed to a second step a S2 signal output from the shutter release button 113 is turned "on".

The flash 112 emits light to brighten a subject that is to be photographed when photographing in dark places.

Figure 1B:
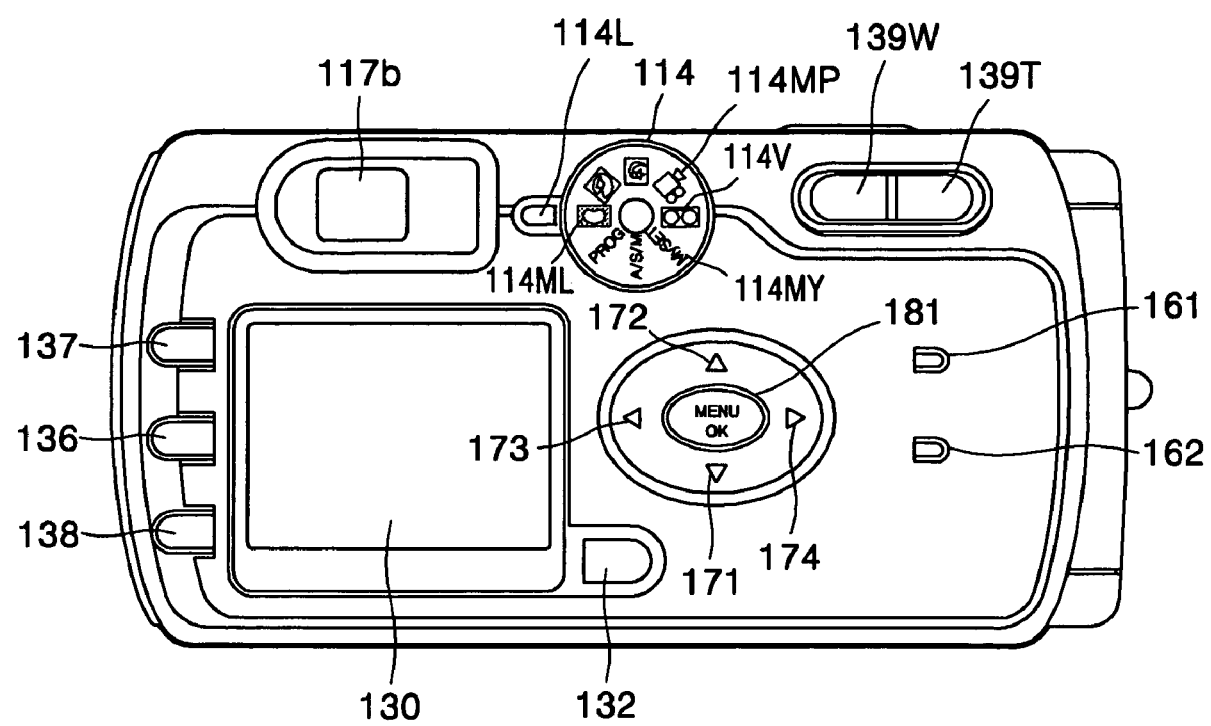
FIG. 1B is a rear view of the digital camera of FIG. 1.

Light reflected from the subject passes through the view finder 117a so that a user can see an image of the subject via a view finder 117b (see FIG. 1B).

The image of the subject is input to the memory of the digital camera 101 via the lens unit 120.

The power switch 131 controls turning the power of the digital camera 101 on/off.

The battery/memory card inserting area 135 is provided on one side of the digital camera 101 to insert a battery and a memory card.

FIG. 1B is a rear view of the digital camera 101 of FIG. 1. Referring to FIG. 1B, a mode dial 114, the view finder 117b, a monitor 130, a play mode button 132, a manual-focus/delete button 136, a manual-adjust/index mode button 137, a monitor button 138, a wide-angle zoom button 139W, a telephoto zoom button 139T, a first hot button 161, a second hot button 162, direction buttons which include a down button 171, an up button 172, a left button 173, and a right button 174, and a menu select button 181 are included on the back of the digital camera 101.

The mode dial 114 is to set an operating mode of the digital camera 101 to, for example, a composite photographing mode 114ML, a program photographing mode, a portrait photographing mode, a night scene photographing mode, a manual photographing mode, a moving picture photographing mode 114MP, a user setting mode 114MY, or an audio recording mode 114V. The composite photographing mode 114ML is a mode in which an input image is photographed by being combined with one of a plurality of subsidiary images. The user setting mode 114MY is a mode in which a user sets photographing information needed to photograph still images or moving pictures. The audio recording mode 114V is a mode in which sound, for example, only a voice of a user, is recorded.

The monitor 130 may be a liquid crystal display (LCD) or an organic light emitting diode (OLED), and it displays images.

The play mode button 132 is used to convert an operating mode of the digital camera 101 into a play mode or a preview mode to display images stored in the digital camera 101.

The manual-focus/delete button 136 is used by a user to manually focus an image or delete an image while in a photographing mode.

The manual-adjust/index mode button 137 is used to manually adjust specific photographing conditions and to select an index mode.

The monitor button 138 is used to control operations of the monitor 135. For example, if a user presses the monitor button 138 for the first time while in a photographing mode, an image of a subject that is to be photographed and its photographing information are displayed on the monitor 130 and if the monitor button 138 is pressed for the second time the monitor 130 is turned off. Also, if a user presses the monitor button 138 for the first time while an image file is being played in a play mode, photographing information for the image file that is being played is displayed on the monitor 130 and if the monitor button 138 is pressed for the second time, only the image is displayed on the monitor 130.

If the wide-angle zoom button 139W is pressed, a view angle increases since the focal length of a zoom lens decreases. If the telephoto zoom button 139T is pressed, a view angle decreases since the focal length of the zoom lens increases.

The first and second hot buttons 161 and 162 are used to help a user search for and find an image stored in the digital storage device. As should be appreciated, the modifier "hot" describing buttons 161, 162 is a term of art and not meant to indicate that the buttons 161, 162 are heated or at a higher temperature. Rather, the hot buttons 161, 162 are understood to have varying functions, for example, depending on the number of times that each button 161, 162 is pressed or whether the button 161, 162 is pressed in combination with another button. Herein, the hot buttons 161, 162 enable a user to quickly navigate through a plurality of index images displayed on various generated screens on a display by facilitating movement (e.g., scrolling) of a cursor from one screen to another screen within the same sub-category and facilitating movement of a cursor between screens of different sub-categories. Herein, the terms index images and thumbnail images (or thumbnails) should be understood as interchangeable and referring to a reduced-size image that is displayed on the monitor 130.

The menu select button 181 is used to display a menu for operating the digital camera 101, and the up button 172, the down button 171, the left button 173, and the right button 174 are used to move a cursor up, down, left, and right, respectively. That is, a menu for setting conditions of an operating mode is displayed on the monitor 130 when a user presses the menu select button 181, and if the user presses the down button 171 in the current state, an active cursor moves down and if the user presses the up button 172, the active cursor moves up. In addition, if the user presses the menu select button 181 when the active cursor is placed on one of selectable items in the menu, an operation corresponding to the selected item is performed.

Therefore, a menu for selecting a subsidiary image is displayed on the monitor 130 when a user presses the menu select button 181 while in the composite photographing mode 114ML. Then, the user manipulates the down button 171 and the up button 172 to select a desired subsidiary image, and presses the menu select button 181 to input a selection confirm signal to a controller (not shown) of the digital camera 101.

Figure 2:
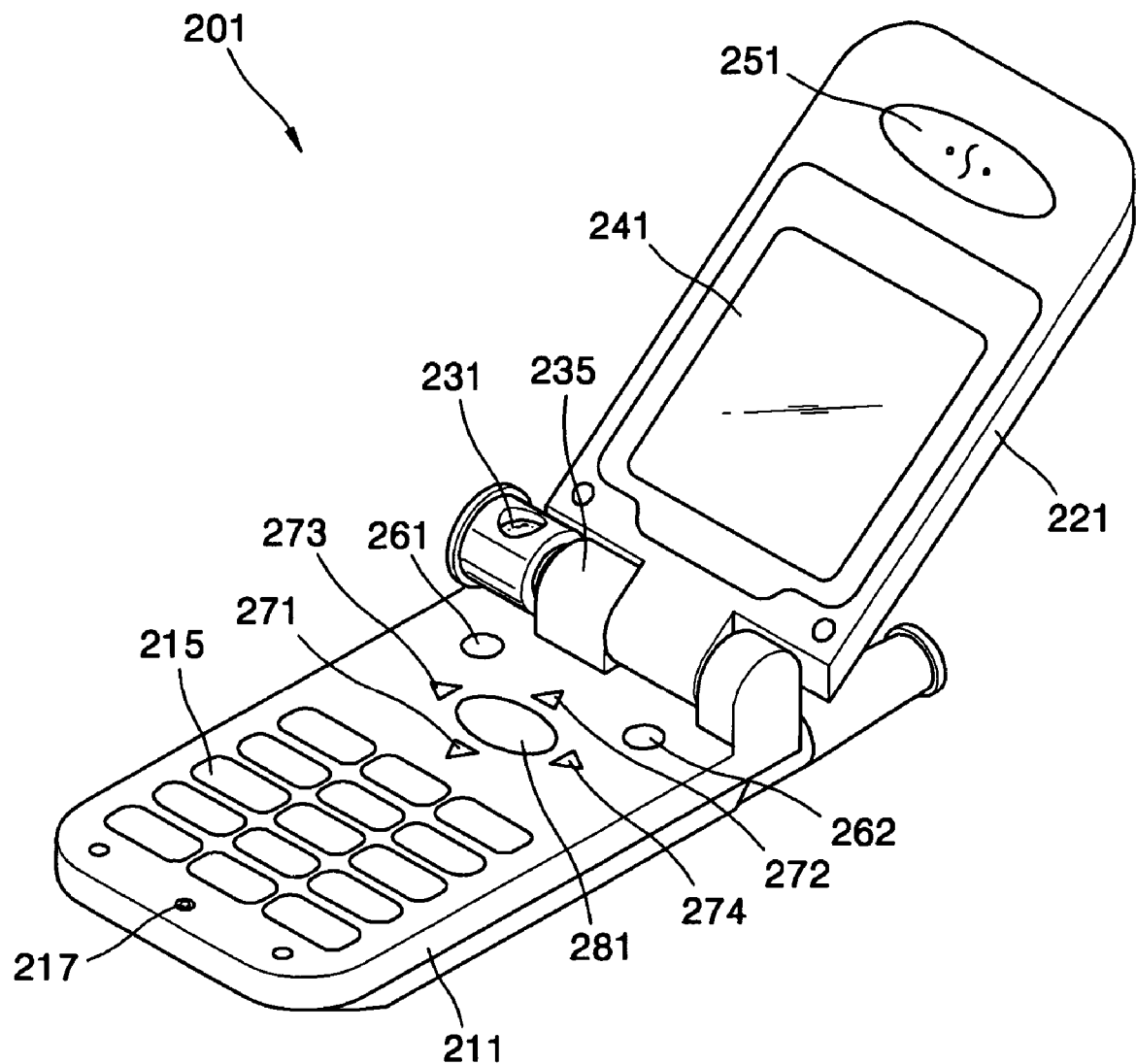
FIG. 2 is a perspective view of a mobile phone according to an embodiment of the present invention.

FIG. 2 is a perspective view of another digital storage device embodied by mobile phone 201. Referring to FIG. 2, the mobile phone 201 includes a main body case 211, a folder unit 221, and a camera module housing 231.

A plurality of key buttons 215, a microphone 217, first and second hot buttons 261 and 262, direction buttons 271 through 274, and a menu select button 281 are disposed on a top surface of the main body case 211. The plurality of key buttons 215 include letter keys, number keys, a delete key, an end key, and special function keys. The microphone 217 inputs a voice of a user. The first and second hot buttons 261 and 262 are used to move from one screen to another in an index mode or to change a sub-menu. The menu select button 281 is used to display a menu. The direction buttons 271 through 274 are used to move a cursor up, down, left, or right.

The folder unit 221 includes a monitor 241 and a speaker 251. The monitor 241 may be an LCD or an OLED, and telephone numbers, text messages, moving pictures, and so on are displayed thereon. The speaker 251 outputs an audio.

A camera to photograph external images is installed in the camera module housing 231. The camera module housing 231 may be protruded from a main body of the mobile phone 201 (i.e., the main body case 211 and the folder unit 221) or may be installed in the main body of the mobile phone 201. The camera module housing 231 may be formed on a hinge 235 when a mobile phone is a folder type mobile phone as illustrated in FIG. 2.

The mobile phone 201 may further include a play button to select a play mode which plays stored images, a delete button to delete selected images, and an index mode button to select an index mode which displays a plurality of thumbnail images.

Figure 3:
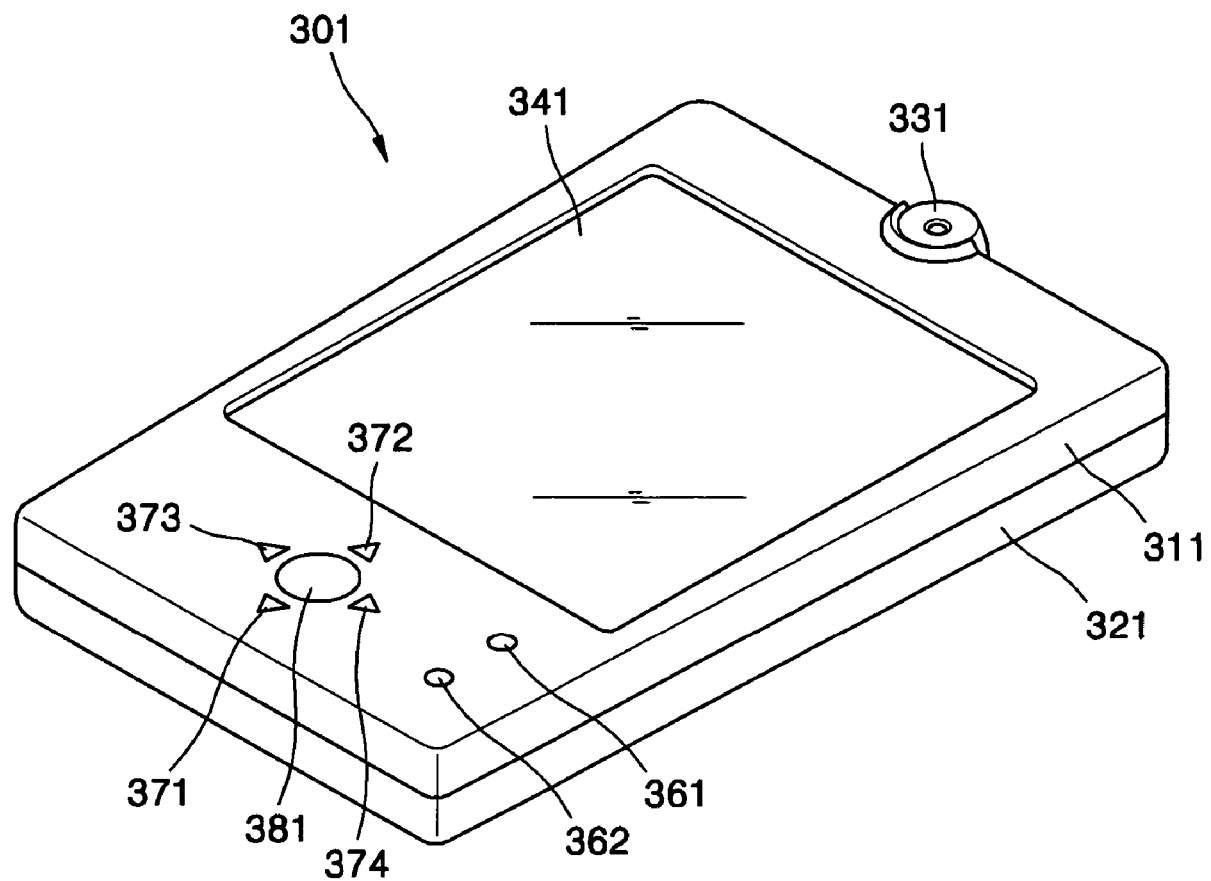
FIG. 3 is a perspective view of a personal digital assistant (PDA) according to an embodiment of the present invention.

FIG. 3 is a perspective view of yet another digital storage device embodied as a personal digital assistant (PDA) 301. Referring to FIG. 3, the PDA 301 includes a top body 311, a bottom body 321, and a camera 331.

The bottom body 321 is combined to the bottom surface of the top body 311, and the camera is installed on one side of the top body 311.

The top body 311 has installed on the top surface thereof a monitor 341, first and second hot buttons 361 and 362, direction buttons 371 through 374, and a menu select button 381.

The monitor 341 may be an LCD or an OLED, and telephone numbers, text messages, moving pictures, and so on are displayed thereon.

The first and second hot buttons 361 and 362 are used to move from one screen to another in an index mode or to change a sub-menu.

The menu select button 381 is used to display a menu. The direction buttons 371 through 374 are used to move a cursor up, down, left, or right.

The PDA 301 may further include a play button to select a play mode which plays stored images, a delete button to delete selected images, and an index mode button to select an index mode which displays a plurality of thumbnail images.

The digital camera 101, the mobile phone 201, and the PDA 301 illustrated in FIGS. 1 through 3 are examples of digital storage devices in which the present invention can be applied. The digital storage device may further include various types of terminals that have a camera installed therein and have a function of storing images photographed using the camera.

Figure 4:
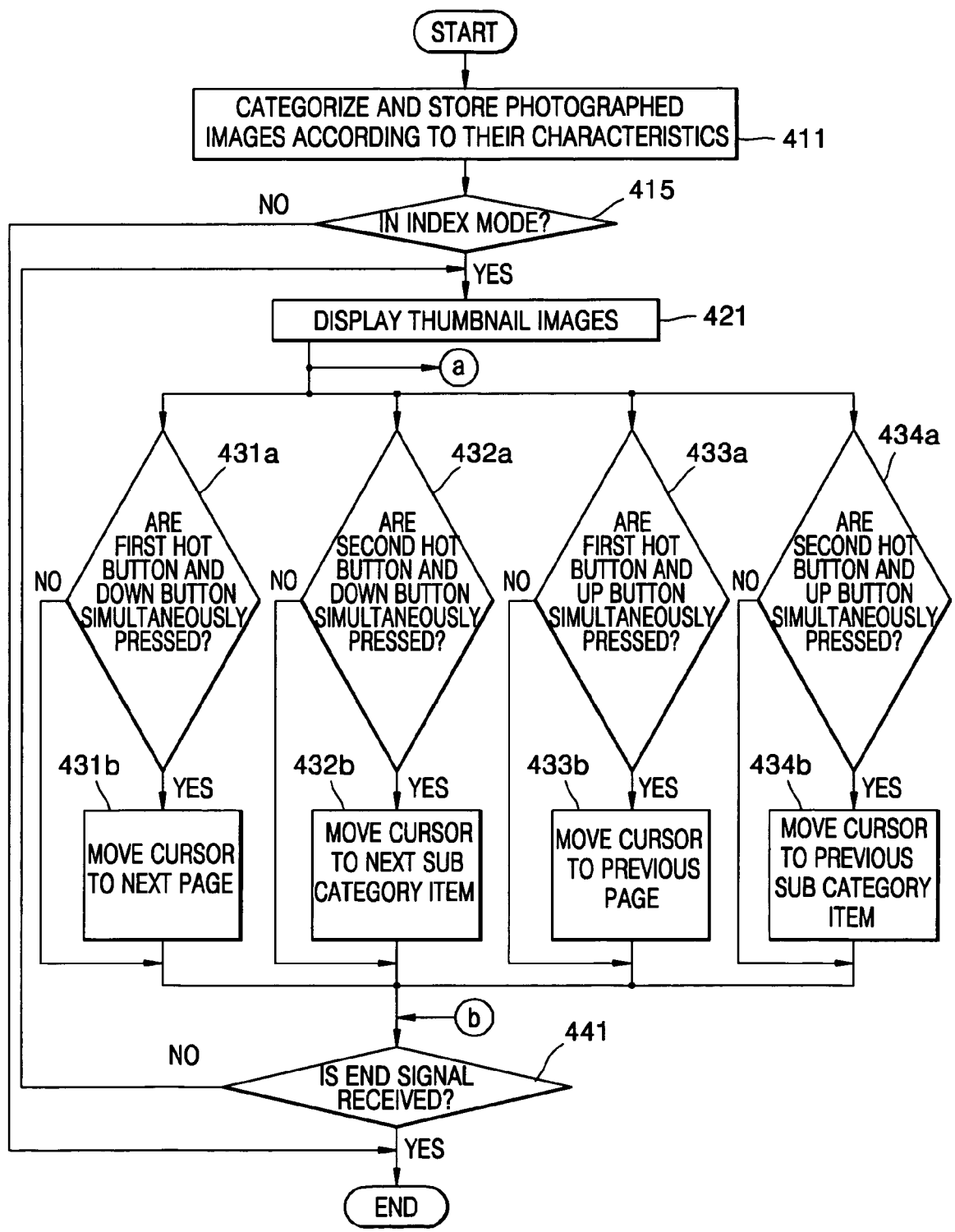
FIG. 4 is a flow chart illustrating a method of searching images in a digital storage device according to an embodiment of the present invention.

FIG. 4 is a flow chart illustrating a method of searching images stored in the digital storage device (i.e., the digital camera 101, the mobile phone 201, and the PDA 301) according to an embodiment of the present invention. Hereinafter, the digital storage device will be described with the digital camera 101 as an example. The method of searching the images stored in the digital camera 101 in FIG. 4 will be described with reference to FIGS. 1 through 3.

As shown in FIG. 4, in step 411 the images photographed using the digital camera 101 are categorized according to their image characteristics. That is, the photographed images are classified according to a predetermined image categorizing method that may be preset or selected by the user. For example, as shown in FIG. 12, the camera 101 may present the user with a display, menu or prompt for categorizing and displaying a plurality of images stored in the camera. The method of categorizing images will be described in more detail below with reference to FIG. 5B.

Figure 13:
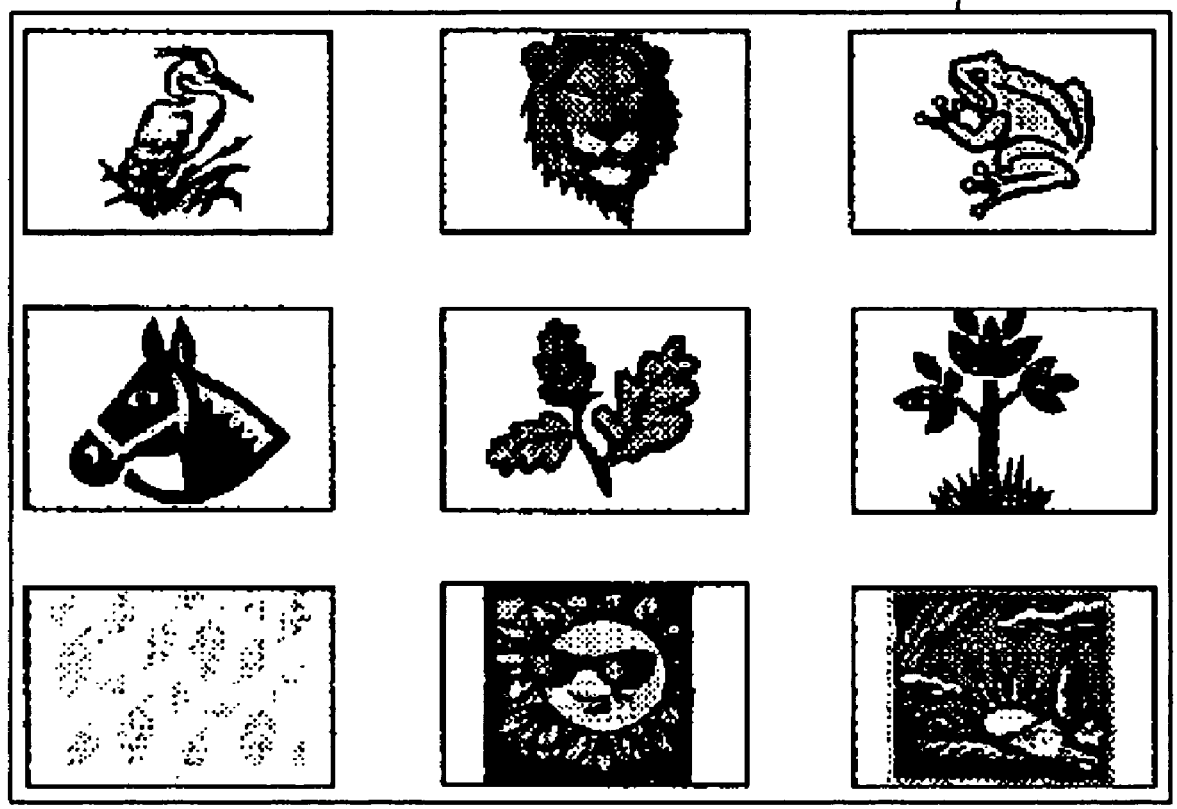
FIG. 13 is a view of exemplary thumbnail images displayed on a monitor according to an embodiment of the present invention.
Figure 14:
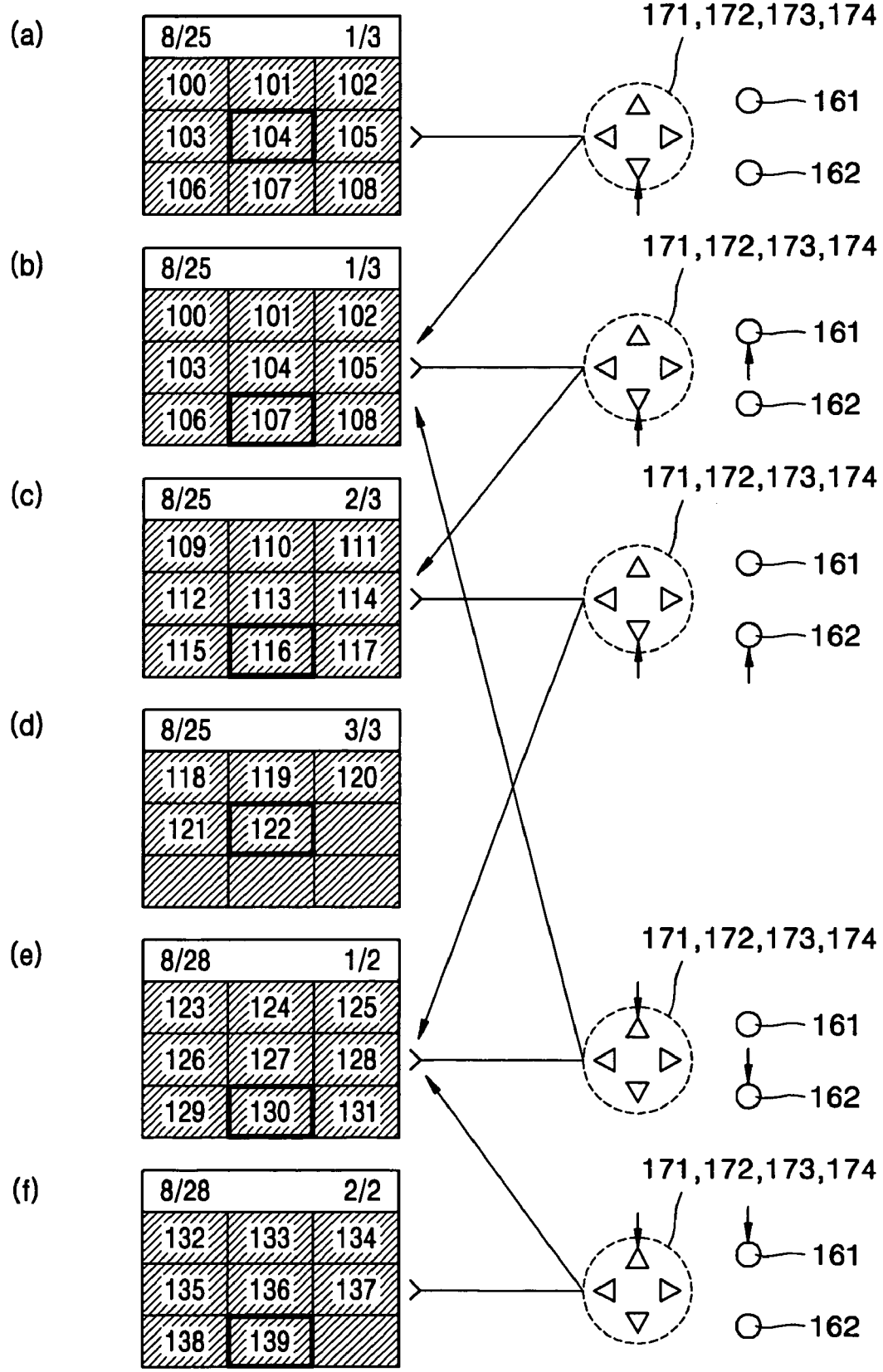
FIGS. 14A-14F are diagrammatic views illustrating the method of searching the images mentioned in FIG. 4.

In step 415 if the index mode is selected, reduced-size (i.e., index or thumbnail) images are displayed in step 421 on the monitor 130 according to the preset image categorizing method. An example of thumbnail images being displayed on the monitor 130 is illustrated in FIG. 13. As shown, the stored images are reduced in size so that nine images may be displayed simultaneously on the display (e.g., monitor 130). For simplicity of description hereinafter, a maximum predetermined number (e.g., nine) of index images, which are arranged in rows and columns, is displayed on the monitor 130 and is referred to as a screen (e.g., screen 213 shown in FIG. 13). Further, if a subcategory includes more than nine images, more than one screen may be displayed consecutively to view all of the images. The digital storage device arranges the images in a number of screens by subcategory by determining a total number of images in a subcategory, dividing the total number of images by a predetermined maximum number of images that can be displayed on a screen simultaneously and rounding a result of the dividing operation to a next whole number. For example, as can be appreciated from viewing FIGS. 14B-14D, a subcategory includes twenty-three images numbered 100 through 122, which are arranged in three screens. As shown in FIG. 14B, a first screen, which is denoted by 1/3 (i.e., one of three) displayed in the upper right corner, includes index images 100 through 108. A second screen as shown in FIG. 14C, which is denoted by 2/3 (i.e., two of three) displayed in the upper right corner, includes index images 109 through 117 and a third screen as shown in FIG. 14D, which is denoted by 3/3 (i.e., three of three) displayed in the upper right corner, includes index images 118 through 122. FIG. 13 illustrates an example where a category by day item is selected by a user from an image categorizing menu 1211 (see FIG. 12). Here, a cursor may be displayed on one of the thumbnail images by pressing one or more of the direction buttons 171-174. The index mode is selected by pressing the manual-adjust/index mode button 137. If the index mode is not selected, an image search terminates.

In steps 431a through 434b a screen displayed on the monitor 130 is changed by pressing the first and second hot buttons 161, 162 and up and down buttons 172 and 171, respectively. FIGS. 14A-14F illustrate a portion of the method of searching for the image. Arrows illustrated in FIGS. 14A-14F denote pressed buttons, and a dark rectangle denotes a location of the cursor. Referring now to FIGS. 14A-14F, the third stage of the method (431a through 434b) will be described.

If the down button 171 is pressed, the digital storage device moves the cursor down one row. For example, when the down button 171 is pressed while the cursor is placed on the center image as illustrated in FIG. 14A, the cursor moves down one row as illustrated in FIG. 14B. When the down button 171 is pressed while the cursor is on the bottom row, the cursor does not move or change the screen to a next screen.

If the first hot button 161 is simultaneously pressed with the down button 171 (431a), the digital storage device moves the cursor to the same location on the next screen (431b). For example, if the first hot button 161 and the down button 171 are simultaneously pressed while the cursor is placed on the center image of the bottom row (numbered 107) on the first screen of photographs, which were taken on August 25 (illustrated as 8/25 in the upper left corner) as illustrated in FIG. 14B, the cursor moves to the center image of the bottom row (numbered 116) on the second screen of the photographs taken on August 25 as illustrated in FIG. 14C. Here, if there is no thumbnail image on the same location on the next screen, the cursor moves to a last image on the next screen. For example, if the first hot button 151 and the down button 171 are pressed when the cursor is located on the photograph numbered 116 of screen 2/3 (i.e., two of three) in FIG. 14C, the cursor will move to the last photograph (numbered 122) of screen 3/3 (i.e., three of three) in FIG. 14D.

If the second hot button 162 is simultaneously pressed with the down button 171 (432a), the digital storage device moves the cursor to the same location on the first screen of a next sub category item (432b), herein, the next date's photographs. For example, if the second hot button 162 and the down button 171 are simultaneously pressed while the cursor is placed on the center image (numbered 116) of the bottom row on the second screen of the photographs taken on August 25 as illustrated in FIG. 14C, the cursor moves to the center image (numbered 130) of the bottom row on the first screen of photographs taken on August 28 as illustrated in FIG. 14E. Here, if there is no thumbnail image on the same location on the next sub category item, herein, the photographs taken on August 28, the cursor moves to a last image of the next sub category item (i.e., photographs taken on August 28).

If the first hot button 161 is simultaneously pressed with the up button 172 (433a), the digital storage device moves the cursor to the same location on the previous screen (433b). For example, if the first hot button 161 and the up button 172 are simultaneously pressed while the cursor is placed on the center image (numbered 139) of the bottom row on the second screen of the photographs taken on August 28 as illustrated in FIG. 14F, the cursor moves to the center image (numbered 130) of the bottom row on the first screen of the photographs taken on August 28 as illustrated in FIG. 14E.

If the second hot button 161 is simultaneously pressed with the down button 171 (434a), the digital storage device moves the cursor to the same place on the first screen of a previous sub category item, that is, the previous date the photographs were taken (434b). For example, if the second hot button 162 and the up button 172 are simultaneously pressed while the cursor is placed on the center image (numbered 130) of the bottom row on the first screen of the photographs taken on August 28 as illustrated in FIG. 14E, the cursor moves to the center image (numbered 107) of the bottom row on the first screen of the photographs taken on August 25 as illustrated in FIG. 14B.

Figure 5A:
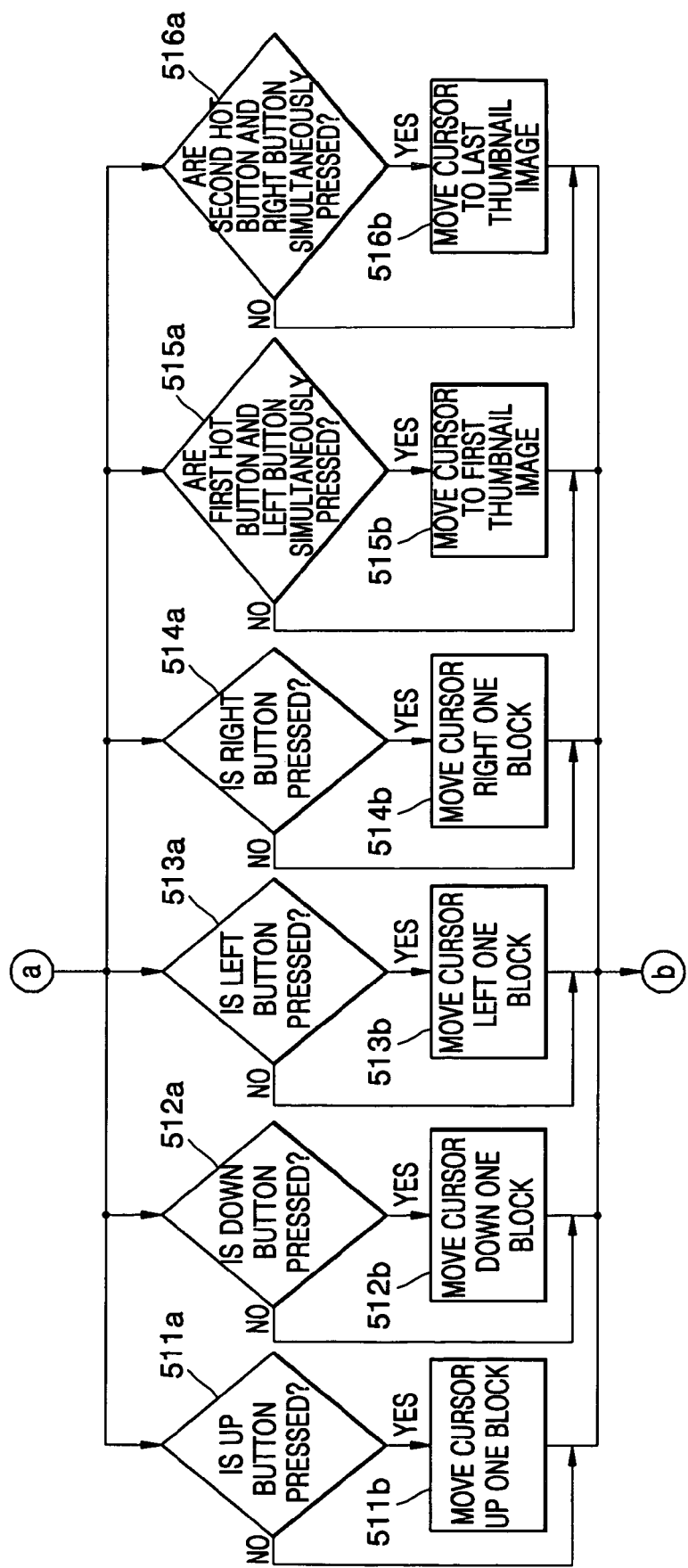
FIG. 5A is a flow chart continuation of FIG. 4.

FIG. 5A is a further flow chart continuing a portion marked a-b in the method of searching the images described in FIG. 4. As illustrated in FIG. 5A, when the down, up, left, and right buttons 171 through 174 are pressed, the digital storage device respectively moves the cursor one block down, up, left, and right at a time. For example, if the up button 172 is pressed (511a), the cursor moves one block up (511b); if the down button 171 is pressed (512a), the cursor moves one block down (512b); if the left button 173 is pressed (513a), the cursor moves one block left (513b); and if the right button 174 is pressed (514a), the cursor moves one block right (514b).

If the first hot button 161 and the left button 173 are simultaneously pressed (515a), the digital storage device moves the cursor to a first thumbnail image (i.e., an image at the top left hand corner) among thumbnail images displayed on the current screen (515b). If the second hot button 162 and the right button 174 are simultaneously pressed (516a), the digital storage device moves the cursor to a last thumbnail image (i.e., an image at the bottom right hand corner) among the thumbnail images displayed on the current screen (516b). Here, this may be configured differently, such as in an opposite way so that the cursor moves to the last thumbnail image when the first hot button 161 and the left button 173 are simultaneously pressed and the cursor moves to the first thumbnail image when the second hot button 162 and the right button 174 are simultaneously pressed.

In step 441 of FIG. 4 the image search is terminated if an end signal is received or returns to step 421 if the end signal is not received.

As such, by changing the screens and sub-category items using the first and second hot buttons 161 and 162 and the up and down buttons 172 and 171, the user may easily and quickly search for a desired image.

Figure 5B:
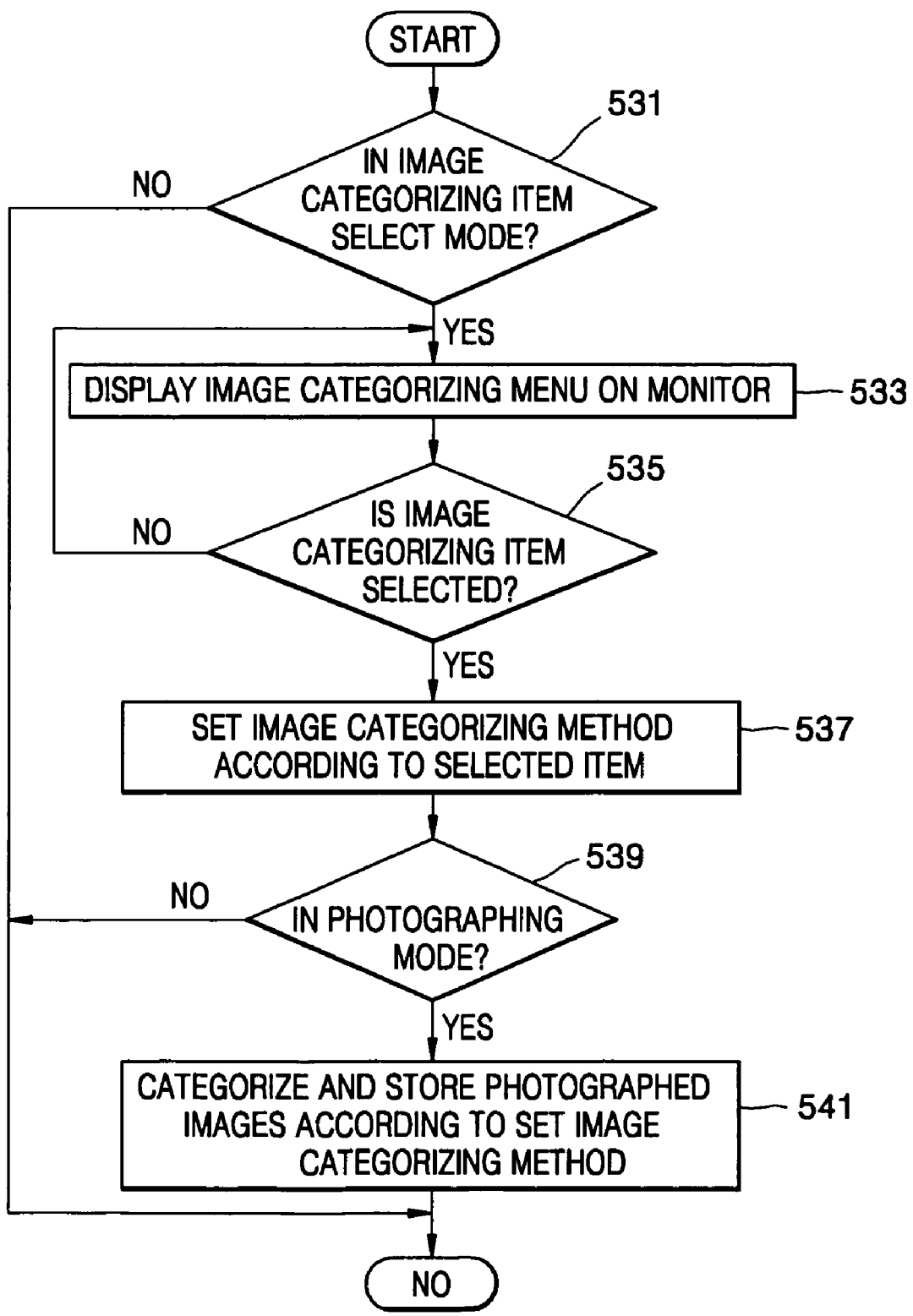
FIG. 5B is a flow chart illustrating an example of categorizing and storing photographed images by their characteristics described in FIG. 4.

FIG. 5B is a flow chart illustrating an example of the first stage, which is the categorizing and storing photographed images by their characteristics (411) described in FIG. 4. That is, FIG. 5B is an example of a method for setting an image categorizing item to categorize a plurality of stored images in the digital storage device.

As shown in FIG. 5, the digital storage device enters an image categorizing item select mode in step 531. That is, if an image categorizing select button (e.g., an index button) is pressed, the digital storage device enters the image categorizing item select mode.

Next in step 533 the digital storage device displays an image categorizing menu including image categorizing items on the monitor 130. An example of the image categorizing menu 1211 is illustrated in FIG. 12. As illustrated in FIG. 12, the image categorizing menu 1211 includes a plurality of categories such as see representative image, basic categorization, categorize by: year, month, day, time, quality of images, resolutions, types of photographing modes, whether flash was used when photographing, and types of files. Each of the categories may further include a plurality of sub categories, and a name of each of the sub categories is displayed on the monitor 130 when a predetermined number of thumbnail images in each sub category are displayed on the monitor 130.

In step 535 if a user selects one of the image categorizing items by moving the cursor displayed on the image categorizing menu, the digital storage device sets the method of categorizing the images based on the selected image categorizing item in step 537. That is, in step 537 the digital storage device prepares to categorize the photographed images according to the method defined by the user-selected image categorizing item.

In step 539 the digital storage device enters a photographing mode. For example, the digital storage device enters the photographing mode to photograph external images via manipulation of the mode dial 114.

In step 541, the digital storage device categorizes and stores the photographed images as the images are captured according to the set method of categorizing the images if the external images are photographed. For example, if the resolution category is selected in the third stage 537, the digital storage device categorizes the photographed images according to their resolutions, and stores the photographed images accordingly (e.g., in separate file folders, memories or the like).

Figure 6:
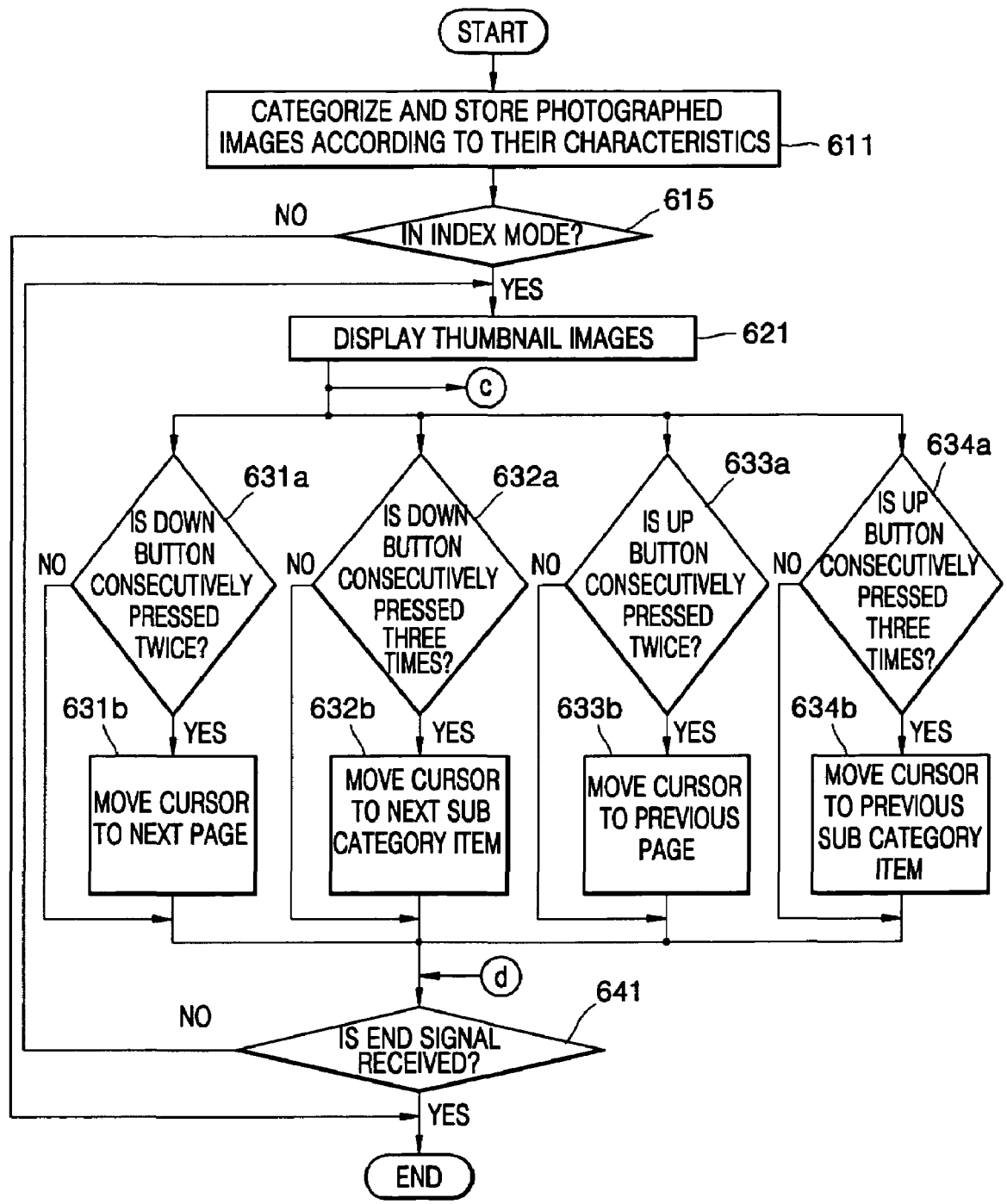
FIG. 6 is a flow chart illustrating a method of searching images in the digital storage device according to another embodiment of the present invention.

FIG. 6 is a flow chart illustrating a method of searching images in the digital storage device according to another embodiment of the present invention. The method of searching the images described in FIG. 6 in the digital storage device will be described with reference to FIGS. 1A through 3. However, the method of searching the images described in FIG. 6 includes, down, up, left, and right buttons 171 through 174, respectively, but does not include the first and second hot buttons 161 and 162. Here, since the initial stages (i.e., steps 611, 615 and 621) of FIG. 6 are substantially similar to the initial stages (i.e., steps 411, 415 and 421) of FIG. 4 that were discussed previously with reference to FIGS. 4 through 5B, and will not be described again for sake of brevity.

In the third stage (comprising steps 631*a* through 634*b*), a screen displayed on the monitor 130 changes according to how many times the up button 172 and the down button 171 are consecutively pressed. FIGS. 15A-15F are views illustrating a portion of the method of searching for the image mentioned in FIG. 6. Arrows in FIGS. 15A-15F denote pressed buttons, and the dark rectangle is the cursor. Referring now to FIGS. 15A-15F, the third stage (comprising steps 631*a* through 634*b*) will be described.

If the down button 171 is pressed once, the digital storage device moves the cursor down one row on the screen. For example, when the down button 171 is pressed while the cursor is placed on the center image (numbered 104) as illustrated in FIG. 15A, the cursor moves down one row as illustrated in FIG. 15B to be on the next lower row's center image (numbered 107). Here (i.e., when the cursor is positioned on an image of the lowest row), the cursor does not move when the down button 171 is pressed.

Figure 15:
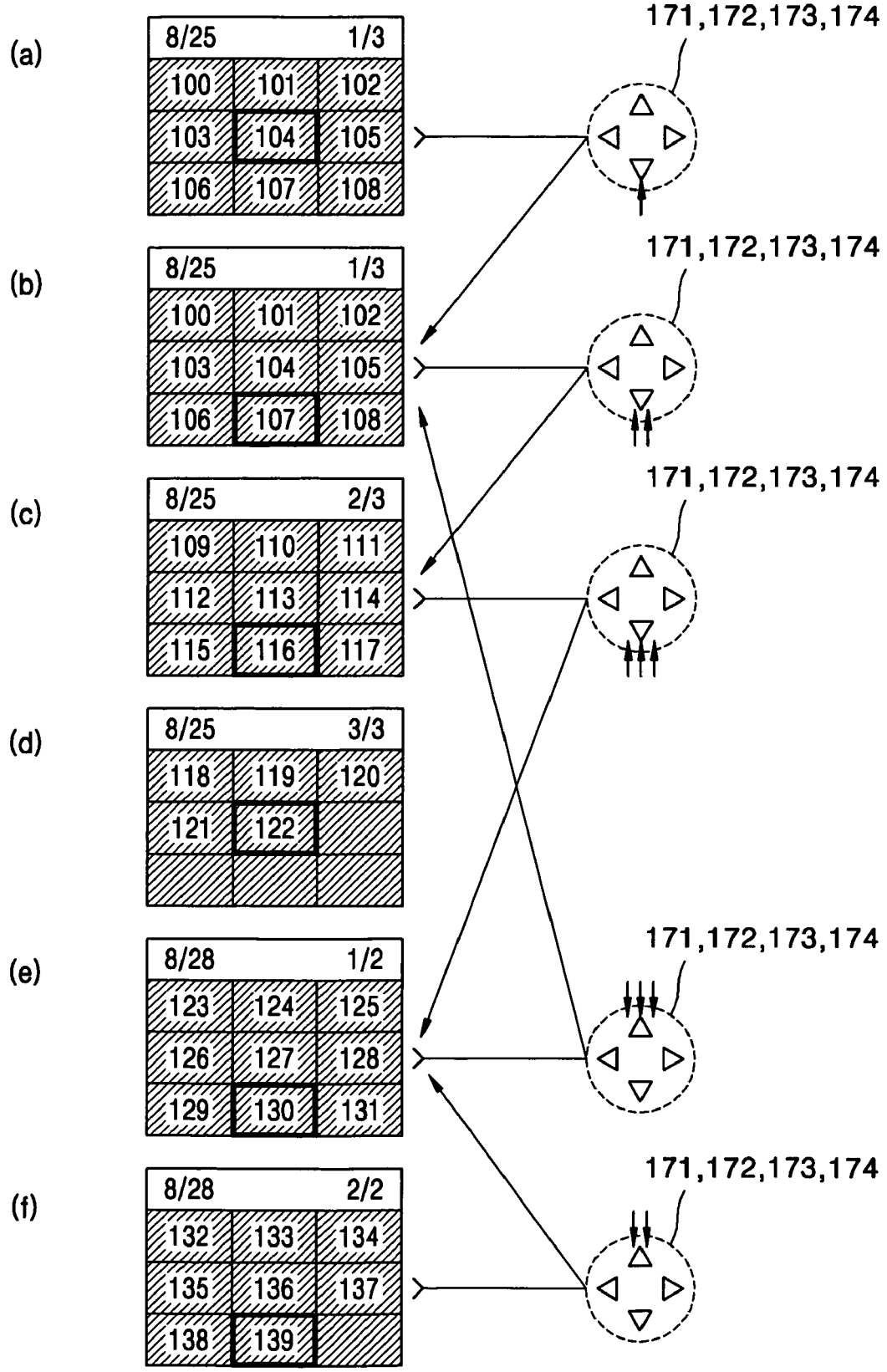
FIGS. 15A-15F are diagrammatic views illustrating the method of searching the images mentioned in FIG. 6.

If the down button 171 is consecutively pressed twice (631*a*), the digital storage device moves the cursor to the same location on the next screen (631*b*). For example, if the down button 171 is consecutively pressed twice while the cursor is placed on the center image (numbered 107) of the bottom row on the first screen of photographs taken on August 25 as illustrated in FIG. 15B, the cursor moves to the center image (numbered 116) of the bottom row on the second screen of the photographs taken on August 25 as illustrated in (c) of FIG. 15. Here, if there is no thumbnail image on the same location on the next screen, the cursor moves to a last image on the next screen.

If the down button 171 is consecutively pressed three times (632*a*), the digital storage device moves the cursor to the same location on the first screen of a next sub category item (i.e., herein, the next date the photographs were taken) (632*b*). For example, if the down button 171 is consecutively pressed three times while the cursor is placed on the center image (numbered 116) of the bottom row on the second screen of the photographs taken on August 25 as illustrated in FIG. 15C, the cursor moves to the center image (numbered 130) of the bottom row on the first screen of photographs taken on August 28 as illustrated in FIG. 15E. Here, if there is no thumbnail image on the same location on the next sub category item, that is, the photographs taken on August 28, the cursor moves to a last image of the next sub category item.

If the up button 172 is consecutively pressed twice (633*a*), the digital storage device moves the cursor to the same location on the previous screen (633*b*). For example, if the up button 172 is consecutively pressed twice while the cursor is placed on the center image (numbered 139) of the bottom row on the second screen of the photographs taken on August 28 as illustrated in FIG. 15F, the cursor moves to the center image (numbered 130) of the bottom row on the first screen of the photographs taken on August 28 as illustrated in FIG. 15E.

If the down button 171 is consecutively pressed three times (634*a*), the digital storage device moves the cursor to the same place on the first screen of a previous sub category item, herein, the previous date the photographs were taken (634*b*). For example, if the up button 172 is consecutively pressed three times while the cursor is placed on the center image (numbered 130) of the bottom row on the first screen of the photographs taken on August 28 as illustrated in FIG. 15E, the cursor moves to the center image (numbered 107) of the bottom row on the first screen of the photographs taken on August 25 as illustrated in FIG. 15B.

Figure 7:
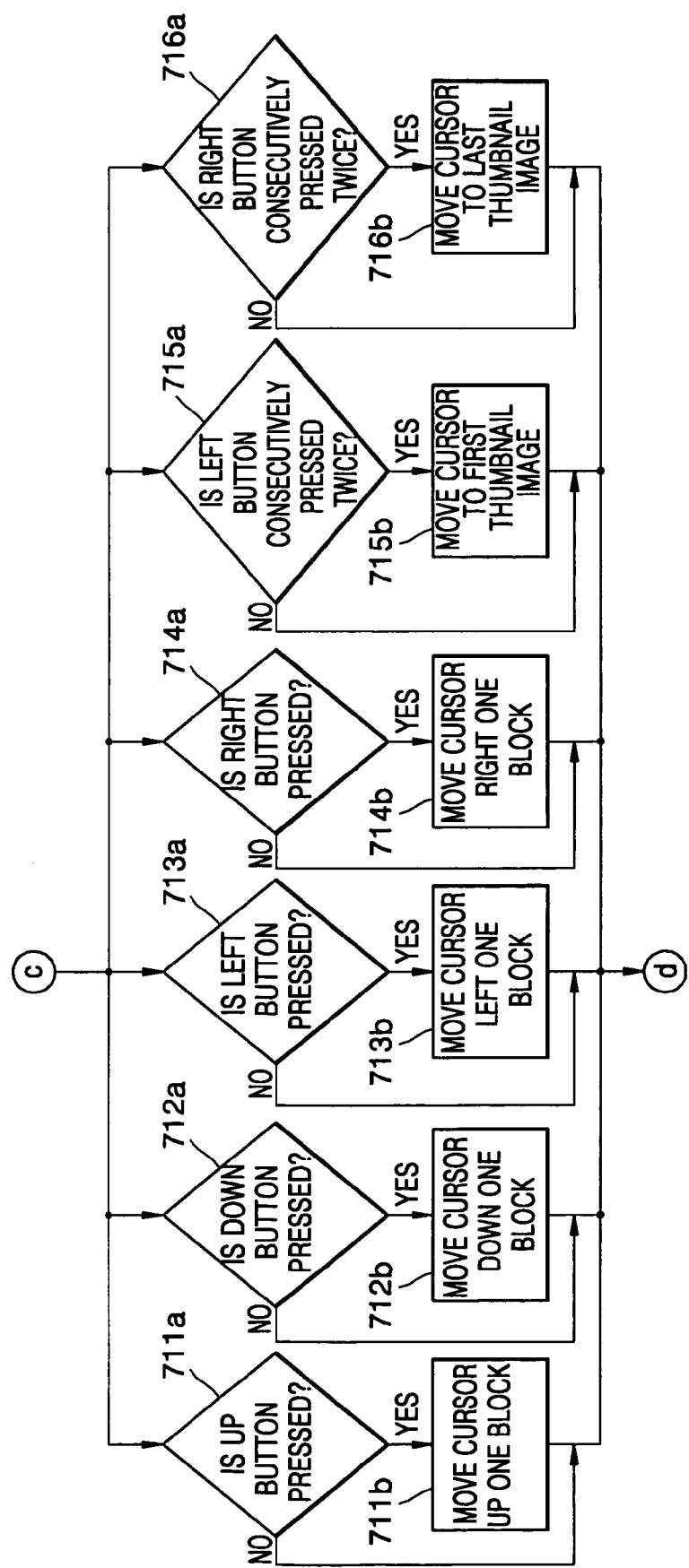
FIG. 7 is a flow chart continuation of FIG. 6.

FIG. 7 is a further flow chart continuing a portion marked c-d in the method of searching the images described in FIG. 6. As illustrated in FIG. 7, when the down, up, left, and right buttons 171 through 174 are pressed, the digital storage device respectively moves the cursor one block down, up, left, and right at a time to navigate the index images displayed on a screen. For example, if the up button 172 is pressed (711*a*), the digital storage device moves the cursor one block up (711*b*); if the down button 171 is pressed (712*a*), the digital storage device moves the cursor one block down (712*b*); if the left button 173 is pressed (713*a*), the digital storage device moves the cursor one block left (713*b*); and if the right button 174 is pressed (714*a*), the digital storage device moves the cursor one block right (714*b*).

If the left button 173 is consecutively pressed twice (715*a*), the digital storage device moves the cursor to a first thumbnail image (i.e., an image at the top left hand corner) among thumbnail images displayed on the current screen (715*b*). If the right button 174 is consecutively pressed twice (716*a*), the digital storage device moves the cursor to a last thumbnail image (i.e., an image at the bottom right hand corner) among the thumbnail images displayed on the current screen (716*b*). Here, this may be configured in an opposite way so that the cursor moves to the last thumbnail image when the left button 173 is consecutively pressed twice and the cursor moves to the first thumbnail image when the right button 174 is consecutively pressed twice.

In the fourth stage, the image search is terminated if an end signal is received (641) or returns to the second stage (621) if the end signal is not received.

As such, by changing the screens and sub category items using the up and down buttons 172 and 171, the user may easily and quickly view a plurality of images to search for a desired image.

Figure 8:
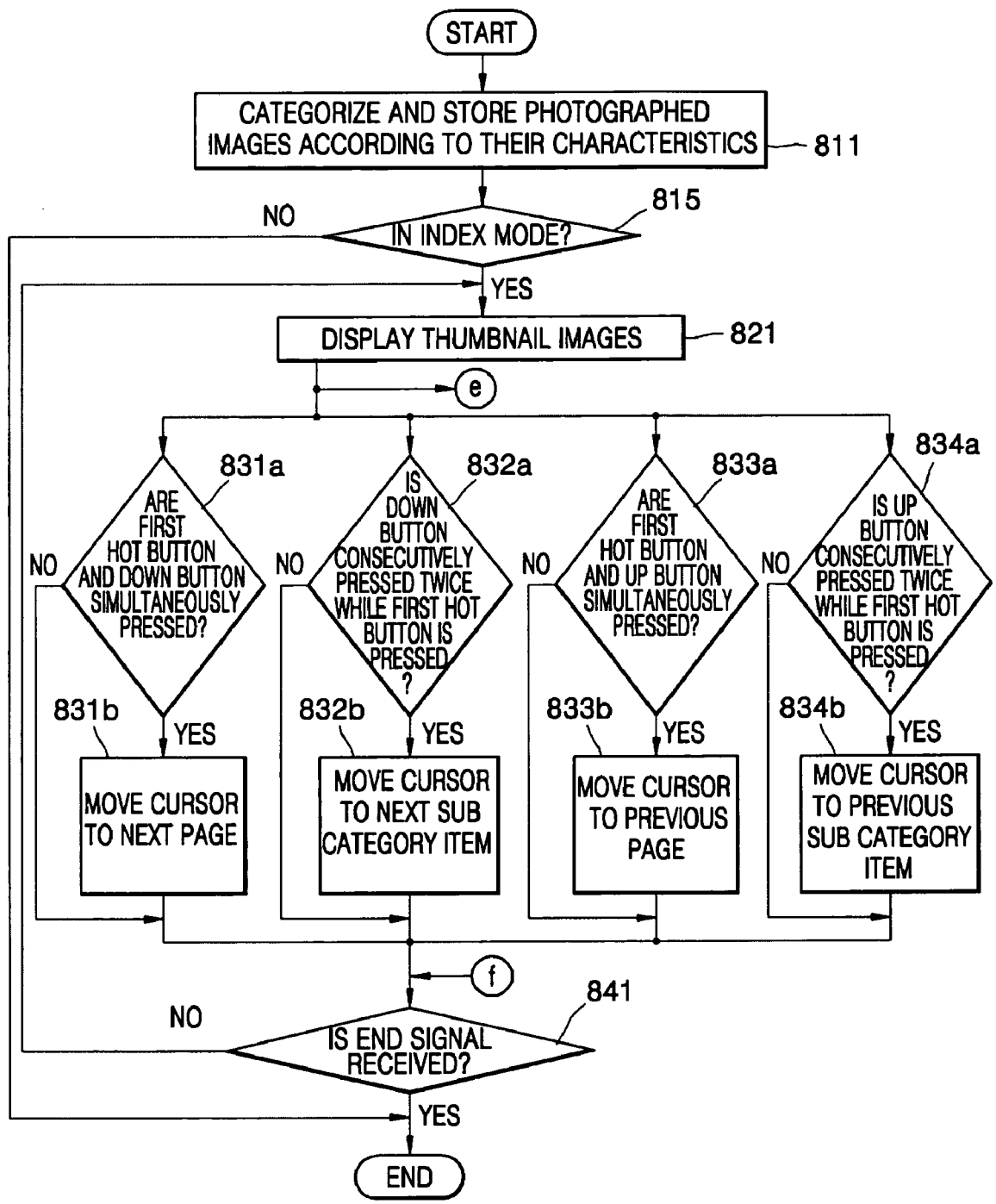
FIG. 8 is a flow chart illustrating a method of searching images in the digital storage device according to another embodiment of the present invention.

FIG. 8 is a flow chart illustrating a method of searching images in the digital storage device according to another embodiment of the present invention. The method of searching the images stored in the digital storage device described in FIG. 8 will be described with reference to FIGS. 1A through 3. However, the method of searching the images described in FIG. 8 includes, down, up, left, and right buttons 171 through 174, respectively, and only the first hot button 161 (i.e., not including the previously mentioned second hot button 162). Here, since the initial stages (comprising steps 811, 815 and 821) of FIG. 8 are substantially similar to the initial stages (i.e., steps 411, 415 and 421) of FIG. 4 and the initial stages (i.e., steps 611, 615 and 621) of FIG. 6 that were discussed previously, the steps 811, 815 and 821 will not be described for sake of brevity.

In the third stage (comprising steps 831*a* through 834*b*), a screen displayed on the monitor 130 changes according a selection made by using the first hot button 161 and the up and down buttons 172, 171. FIGS. 16A-16F are views to explain the method of searching the images mentioned in FIG. 8. Arrows in FIGS. 16A-16F denote pressed buttons, and the dark rectangle is the location of the cursor. Referring to FIGS. 16A-16F, the third stage (comprising 831a through 834b) will be described.

Figure 16:
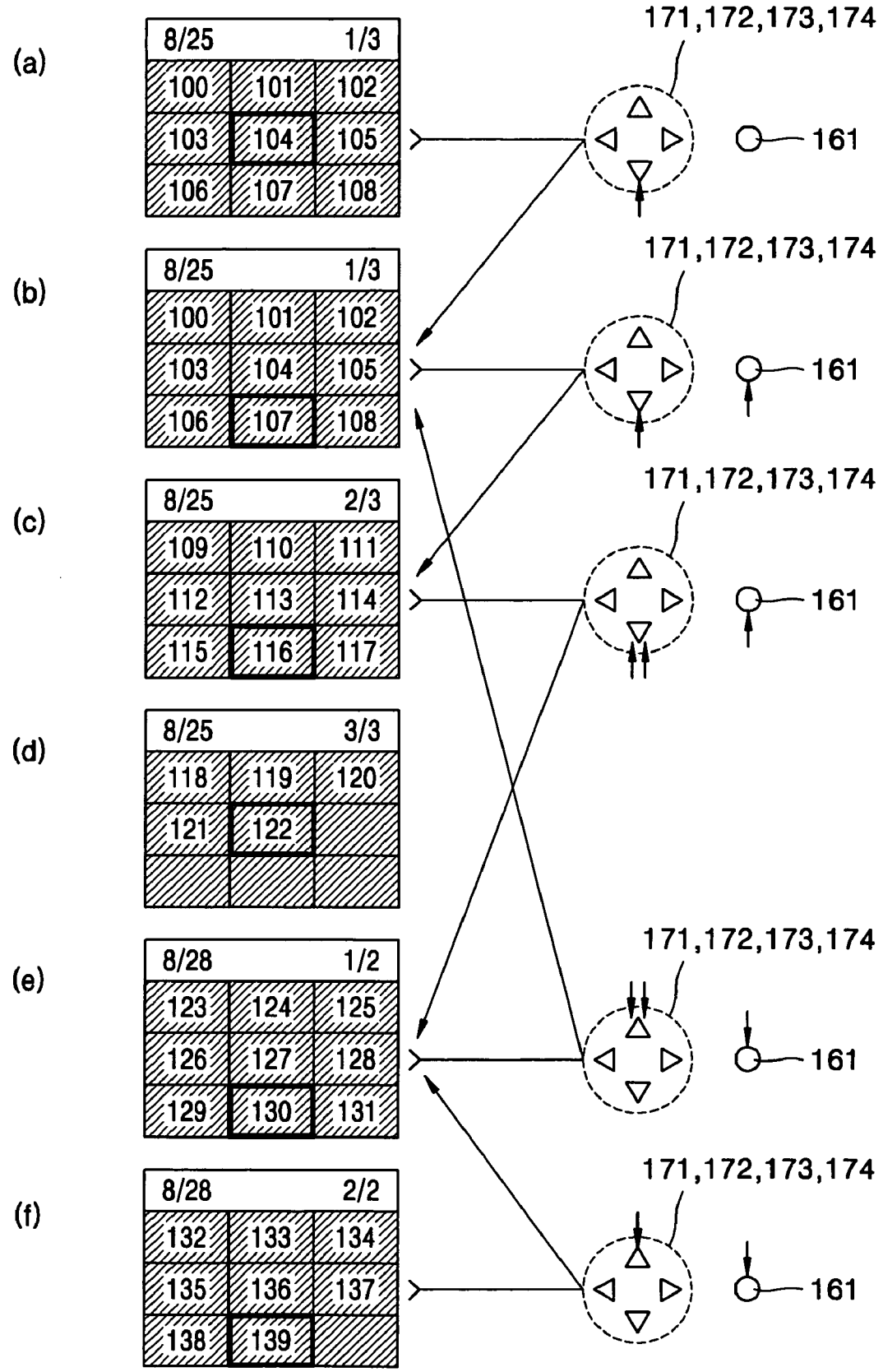
FIGS. 16A-16F are diagrammatic views illustrating the method of searching the images mentioned in FIG. 8.

If the down button 171 is pressed once, the digital storage device moves the cursor down one row. For example, when the down button 171 is pressed while the cursor is placed on the center image (numbered 104) as illustrated in FIG. 16A, the cursor moves down one row to the image numbered 107 as illustrated in FIG. 16B. When the cursor is positioned on an image of the lowest row (e.g., images numbered 106, 107 and 108 of FIGS. 16A-16B) the cursor does not move down when the down button 171 is pressed.

If the first hot button 161 and the down button 171 are simultaneously pressed (831a), the digital storage device moves the cursor to the same location on the next screen (831b). For example, if the first hot button 161 and the down button 171 are simultaneously pressed while the cursor is placed on the center image (numbered 107) of the bottom row on the first screen of photographs taken on August 25 as illustrated in FIG. 16B, the cursor moves to the center image (numbered 116) of the bottom row on the second screen of the photographs taken on August 25 as illustrated in FIG. 16C. Here, if there is no thumbnail image on the same location on the next screen, the cursor moves to a last image on the next screen.

If the down button 171 is consecutively pressed two times while the first hot button 161 is pressed (832a), the digital storage device moves the cursor to the same location on the first screen of a next sub category item, that is, the next date the photographs were taken (832b). For example, if the down button 171 is consecutively pressed two times while the first hot button 161 is pressed while the cursor is placed on the center image (numbered 116) of the bottom row on the second screen of the photographs taken on August 25 as illustrated in FIG. 16C, the cursor moves to the center image (numbered 130) of the bottom row on the first screen of photographs taken on August 28 as illustrated in FIG. 16E. Here, if there is no thumbnail image on the same location on the next sub category item, that is, the photographs taken on August 28, the cursor moves to a last image of the next sub category item.

If the up button 172 is simultaneously pressed with the first hot button 161 (833a), the digital storage device moves the cursor to the same location on the previous screen (833b). For example, if the up button 172 is simultaneously pressed with the first hot button 161 while the cursor is placed on the center image (numbered 139) of the bottom row on the second screen of the photographs taken on August 28 as illustrated in FIG. 16F, the cursor moves to the center image (numbered 130) of the bottom row on the first screen of the photographs taken on August 28 as illustrated in FIG. 16E.

If the up button 172 is consecutively pressed twice while the first hot button 161 is pressed (834a), the digital storage device moves the cursor to the same place on the first screen of a previous sub category item, that is, the previous date the photographs were taken (834b). For example, if the up button 172 is consecutively pressed twice while the first hot button 161 is pressed while the cursor is placed on the center image (numbered 130) of the bottom row on the first screen of the photographs taken on August 28 as illustrated in FIG. 16E, the cursor moves to the center image (numbered 107) of the bottom row on the first screen of the photographs taken on August 25 as illustrated in FIG. 16B.

Figure 9:
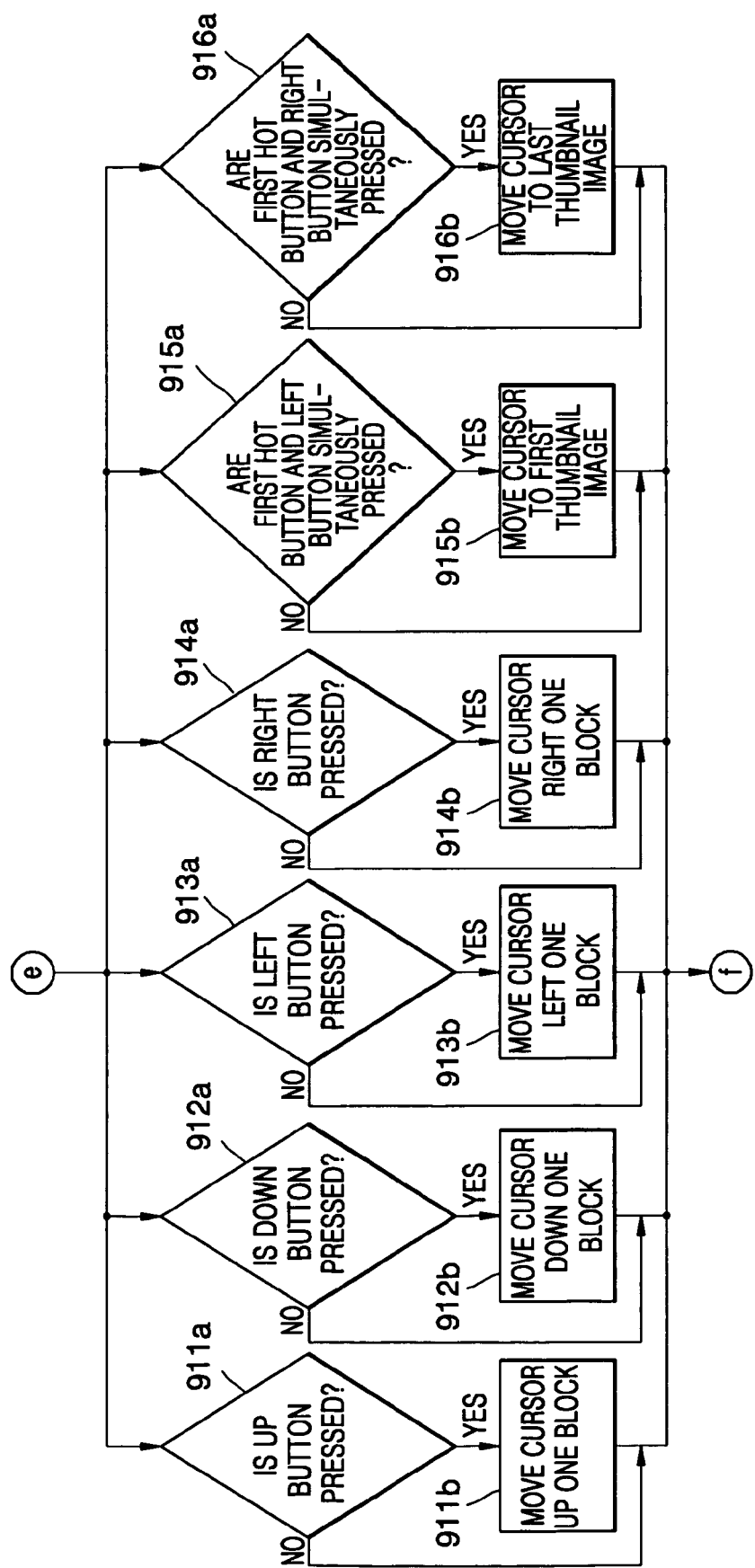
FIG. 9 is a flow chart continuation of FIG. 8.

FIG. 9 is a further flow chart continuing a portion marked e-f in the method of searching the images described in FIG. 8. As illustrated in FIG. 9, when the down, up, left, and right buttons 171 through 174 are pressed, the digital storage device respectively moves the cursor one block down, up, left, and right at a time. For example, if the up button 172 is pressed (911a), the digital storage device moves the cursor one block up (911b); if the down button 171 is pressed (912a), the digital storage device moves the cursor one block down (912b); if the left button 173 is pressed (913a), the digital storage device moves the cursor one block left (913b); and if the right button 174 is pressed (914a), the digital storage device moves the cursor one block right (914b).

If the first hot button 161 and the left button 173 are simultaneously pressed (915a), the digital storage device moves the cursor to a first thumbnail image (i.e., an image at the top left hand corner) among thumbnail images displayed on the current screen (915b). If the first hot button 161 and the right button 174 are simultaneously pressed (916a), the digital storage device moves the cursor to a last thumbnail image (i.e., an image at the bottom right hand corner) among the thumbnail images displayed on the current screen (916b). Here, the function of the combined first hot button 161 and each of the left and right buttons 173, 174 may be configured in an opposite way so that the cursor moves to the last thumbnail image when the first hot button 161 and the right button 174 are simultaneously pressed and the cursor moves to the first thumbnail image when the first hot button 161 and the right button 174 are simultaneously pressed.

In the fourth stage, the image search is terminated if an end signal is received (841) or returns to the second stage (821) if the end signal is not received.

As such, by changing the screens displayed by using the first hot button 161 and the up and down buttons 172 and 171, the user may easily and quickly search for a desired image by moving a cursor intra-subcategory (i.e., from one screen to another screen within the same subcategory) and inter-subcategory (i.e., from one screen in a first subcategory to a corresponding relative screen in a second subcategory).

Figure 10:
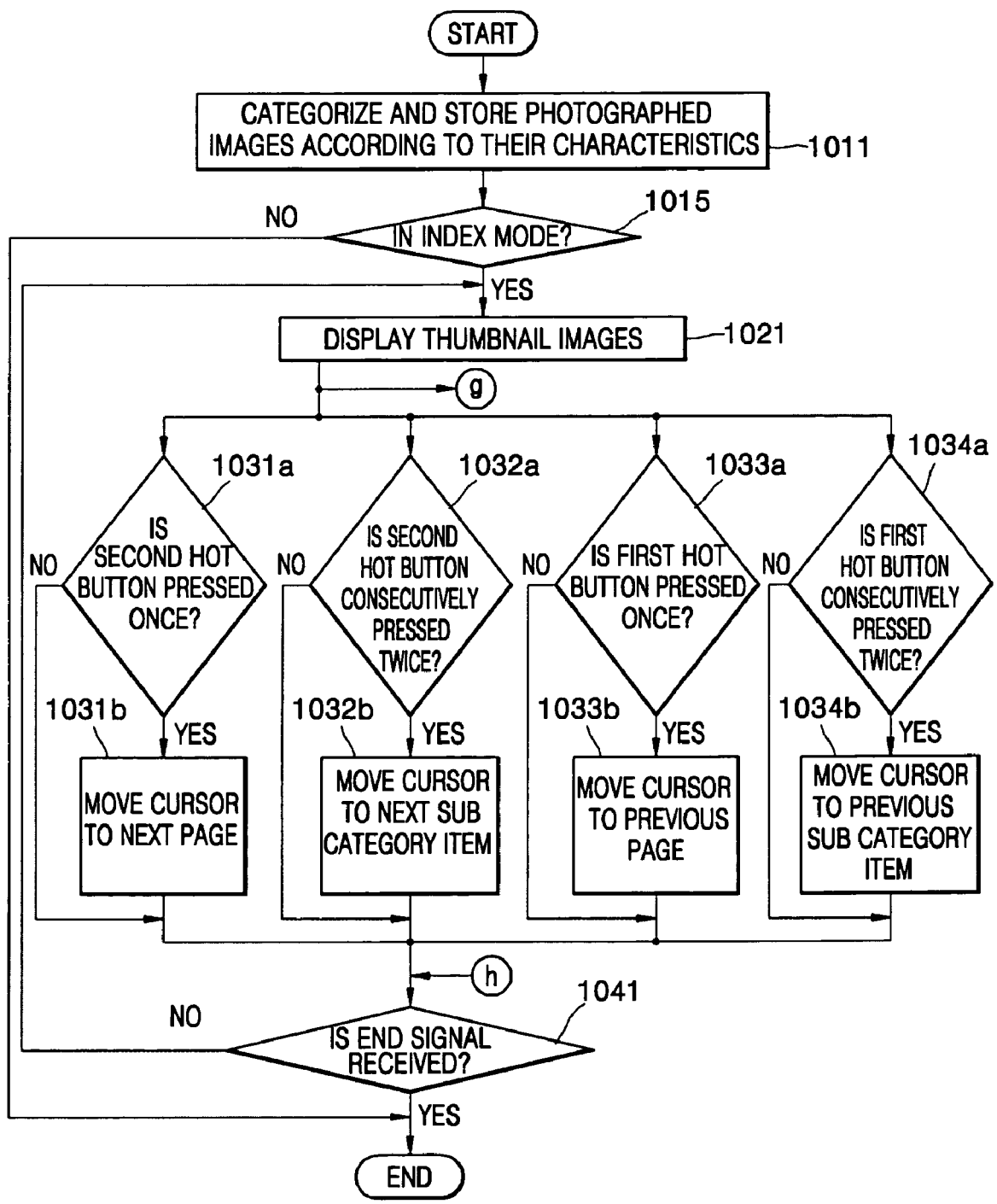
FIG. 10 is a flow chart illustrating a method of searching images in the digital storage device according to another embodiment of the present invention.

FIG. 10 is a flow chart illustrating a method of searching images in the digital storage device according to another embodiment of the present invention. The method of searching the images stored in the digital storage device described in FIG. 10 will be described with reference to FIGS. 1A through 3. Since the initial stages (comprising steps 1011, 1015 and 1021) of FIG. 10 are substantially similar to the initial stages (i.e., steps 411, 415 and 421) of FIG. 4, the initial stages (i.e., steps 611, 615 and 621) of FIG. 6 and the initial stages (comprising steps 811, 815 and 821) of FIG. 8 that were discussed previously, the steps 1011, 1015 and 1021 will not be described for sake of brevity.

In the third stage (comprising steps 1031a through 1034b), a screen displayed on the monitor 130 changes according a selection made by using the first and second hot buttons 161 and 162. FIGS. 17A-17F are views to explain the method of searching the images mentioned in FIG. 10. Arrows in FIGS. 17A-17F denote pressed buttons, and the dark rectangle is the cursor. Referring now to FIGS. 17A-17F, the third stage (comprising steps 1031a through 1034b) will be described.

Figure 17:
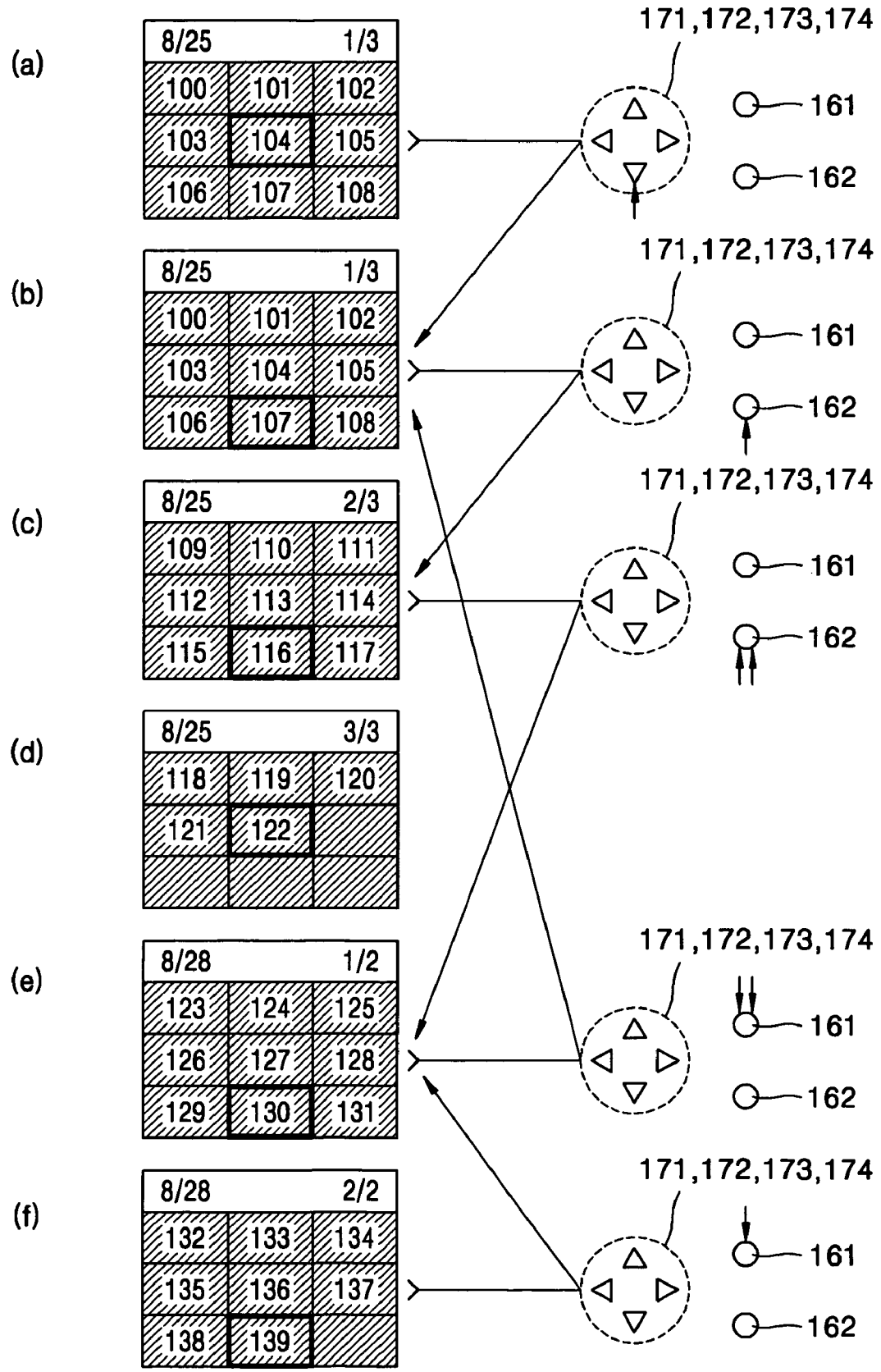
FIGS. 17A-17F are diagrammatic views illustrating the method of searching the images mentioned in FIG. 10.

As described hereinabove, if the down button 171 is pressed once, the digital storage device moves the cursor down one row. For example, when the down button 171 is pressed while the cursor is placed on the center image (numbered 104) as illustrated in FIG. 17A, the cursor moves down one row to an image numbered 107 as illustrated in FIG. 17B. When the cursor is on the bottom row of a screen, the cursor does not move (e.g., to a next screen such as moving from screen 1/3 to screen 2/3) when the down button 171 is pressed.

If the second hot button 162 is pressed once (1031*a*), the digital storage device moves the cursor to the same location on the next screen (1031*b*). For example, if the second hot button 162 is pressed once while the cursor is placed on the center image (numbered 107) of the bottom row on the first screen of photographs taken on August 25 as illustrated in FIG. 17B, the cursor moves to the center image (numbered 116) of the bottom row on the second screen of the photographs taken on August 25 as illustrated in FIG. 17C. When there is no thumbnail image on the same relative location on the next screen the cursor moves to a last image on the next screen.

If the second hot button 162 is consecutively pressed twice (1032*a*), the digital storage device moves the cursor to the same location on the first screen of a next sub category item, herein, the next date the photographs were taken (1032*b*). For example, if the second hot button 162 is consecutively pressed twice while the cursor is placed on the center image (numbered 116) of the bottom row on the second screen of the photographs taken on August 25 as illustrated in FIG. 17C, the cursor moves to the center image (numbered 130) of the bottom row on the first screen of photographs taken on August 28 as illustrated in FIG. 17E. When there is no thumbnail image on the same location on the next sub category item, that is, the photographs taken on August 28, the cursor moves to a last image on the corresponding screen of the next sub category item.

If the first hot button 161 is pressed once (1033*a*), the digital storage device moves the cursor to the same location on the previous screen (1033*b*). For example, if the first hot button 161 is pressed while the cursor is placed on the center image (numbered 139) of the bottom row on the second screen of the photographs taken on August 28 as illustrated in FIG. 17F, the cursor moves to the center image (numbered 130) of the bottom row on the first screen of the photographs taken on August 28 as illustrated in FIG. 17E.

If the first hot button 162 is consecutively pressed twice (1034*a*), the digital storage device moves the cursor to the same place on the first screen of a previous sub category item, that is, the previous date the photographs were taken (1034*b*). For example, if the second hot button 162 is consecutively pressed twice while the cursor is placed on the center image (numbered 130) of the bottom row on the first screen of the photographs taken on August 28 as illustrated in FIG. 17E, the cursor moves to the center image (numbered 107) of the bottom row on the first screen of the photographs taken on August 25 as illustrated in FIG. 17B.

Figure 11:
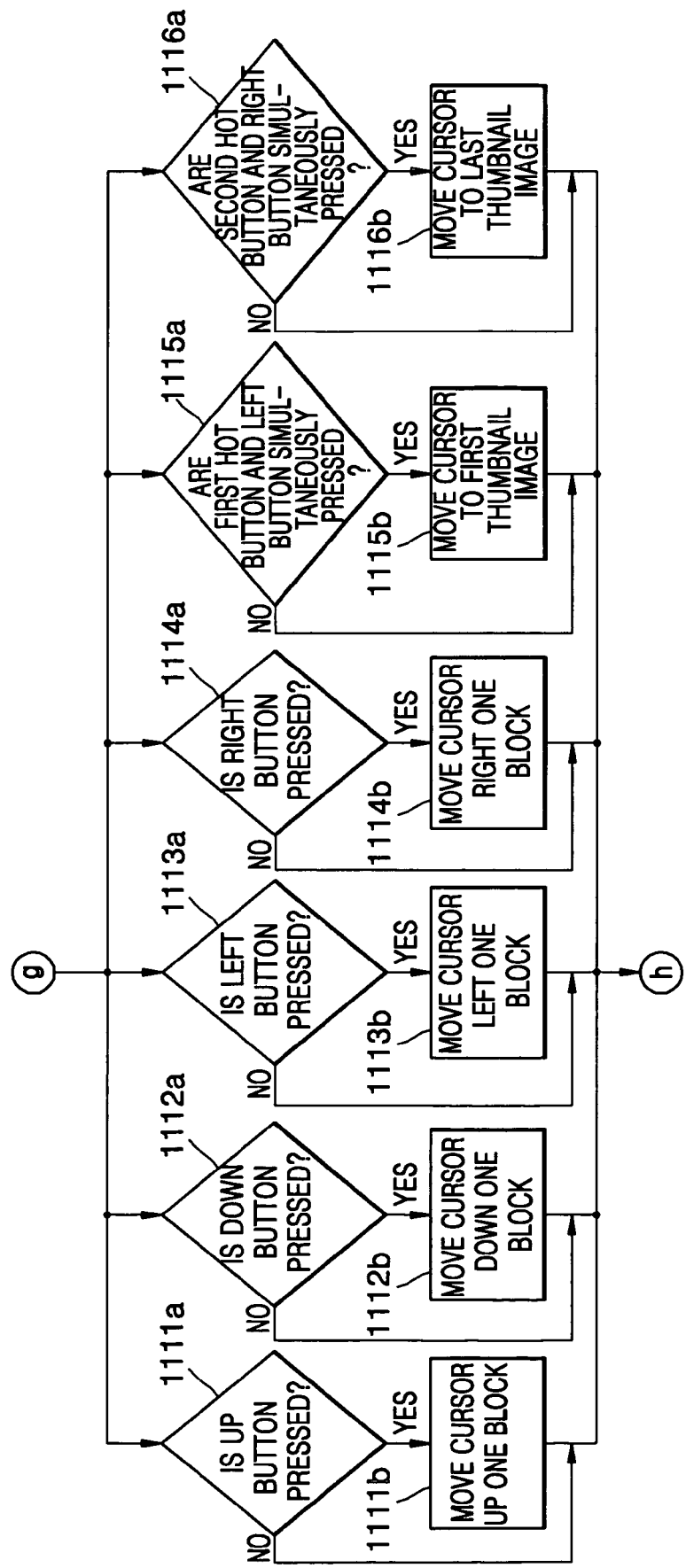
FIG. 11 is a flow chart continuation of FIG. 10.

FIG. 11 is a further flow chart continuing a portion marked g-h in the method of searching the images described in FIG. 10. As illustrated in FIG. 11, when the down, up, left, and right buttons 171 through 174 are pressed, the digital storage device respectively moves the cursor one block down, up, left, and right at a time. For example, if the up button 172 is pressed (1111*a*), the digital storage device moves the cursor one block up (1111*b*); if the down button 171 is pressed (1112*a*), the digital storage device moves the cursor one block down (1112*b*); if the left button 173 is pressed (1113*a*), the digital storage device moves the cursor one block left (1113*b*); and if the right button 174 is pressed (1114*a*), the digital storage device moves the cursor one block right (1114*b*).

If the first hot button 161 and the left button 173 are simultaneously pressed (1115*a*), the digital storage device moves the cursor to a first thumbnail image (i.e., an image at the top left hand corner) among thumbnail images displayed on the current screen (1115*b*). If the second hot button 162 and the right button 174 are simultaneously pressed (1116*a*), the digital storage device moves the cursor to a last thumbnail image (i.e., an image at the bottom right hand corner) among the thumbnail images displayed on the current screen (1116*b*). Here, the functions of combining the hot buttons 161, 162 and the left and right buttons 173, 174 may be configured in an opposite way so that the cursor moves to the last thumbnail image when the first hot button 161 and the left button 173 are simultaneously pressed and the cursor moves to the first thumbnail image when the second hot button 162 and the right button 174 are simultaneously pressed.

In the fourth stage, the image search is terminated if an end signal is received (1041) or returns to the second stage (1021) if the end signal is not received.

As such, by changing the screens displayed within and between sub category items using the first and second hot buttons 161 and 162, the user may easily and quickly display a plurality of image to search for a desired image.

As described above, a user may easily search for thumbnail images on other screens or under different categories by including two hot buttons and four direction buttons. Therefore, the user may conveniently search for a desired image even if there are hundreds of images stored in digital storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of searching for a desired image of a plurality of images stored in a digital storage device, the method comprising:
   a) categorizing each image of the plurality of images into a category according to an image characteristic;
   a1) subcategorizing each category;
   b) displaying a first screen including only a first subset of thumbnail images from a first subcategory on a monitor of the digital storage device, the first subcategory being at least a portion of a first category;
   b1) displaying on the monitor a first indicia identifying the subcategory;
   b2) displaying on the monitor a second indicia identifying the subset and a total number of subsets in the subcategory;
   c) determining if one button of a four-way direction button was pressed together with one of a first and second hot button, the first hot button being operative to change subsets of images being displayed in only an intra-subcategory manner, and the second hot button being operative to change subsets of images being displayed in only an inter-subcategory manner;
   d) displaying a second screen including only a second subset of thumbnail images from the first subcategory if, according to step c, the one button of the four-way direction button was pressed with the first hot button;
   e) displaying a third screen including only a first subset of thumbnail images from a second subcategory if, according to step c, the one button of the four-way direction button was pressed with the second hot button; and
   f) updating, according to step c, at least one of the first indicia to show the second subcategory and the second indicia to show the second subset.

2. The method of claim 1 wherein the categorizing step comprises:

detecting a user-actuated signal to enter an image categorizing item select mode;

displaying an image categorizing menu on the monitor; and receiving a user-setting signal relative to a menu selection from the image categorizing menu; and grouping the images based on the menu selection.

3. The method of claim 1 wherein the first indicia is displayed in a first corner of the monitor; and the second indicia is displayed in a second corner of the monitor.

4. The method of claim 1 wherein the step b2 of displaying a second indicia further comprises:

determining a total number of images in a subcategory;

dividing the total number of images by a predetermined maximum number of images that can be displayed on a screen simultaneously; and rounding a result of the dividing step to a next whole number.

5. The method of claim 1 wherein step b further comprises displaying a cursor on a thumbnail image of the first subset that is in a first position.

6. The method of claim 5 wherein step d further comprises:

d1) determining if a thumbnail image of the second subset is being displayed in the first position; and d2) displaying, relative to step d1, the cursor on one of a thumbnail image of the second subset that is in the first position and a last thumbnail image of the second subset.

7. The method of claim 5 wherein step e further comprises:

e1) determining if a thumbnail image of the second subcategory's first subset is being displayed in the first position; and e2) displaying, relative to step e1, the cursor on one of a thumbnail image of the second subcategory's first subset that is in the first position and a last thumbnail image of the second subcategory.

8. The method of claim 1 wherein the four-way direction button consists of an up direction button, a down direction button, a left direction button and a right direction button.

9. A method of searching for a desired image of a plurality of images stored in a digital storage device, the method comprising:

a) categorizing each image of the plurality of images into a category according to an image characteristic;

a1) subcategorizing each category;

b) displaying a first screen including only a first subset of thumbnail images from a first subcategory on a monitor of the digital storage device;

b1) displaying on the monitor a first indicia identifying the subcategory;

b2) displaying on the monitor a second indicia identifying the subset and a total number of subsets in the subcategory;

c) determining if one of a first and second direction button was pressed together with a hot button, the first and second direction buttons being two of four buttons constituting a four-way direction button;

d) determining a number of times that one of the first and second direction button of the four-way direction button was pressed;

e) displaying a second screen including only a second subset of thumbnail images from the first category if, according to step d, one of the first and second direction button of the four-way direction button was pressed one time with the hot button;

f) displaying a third screen including only a first subset of thumbnail images from a second category if, according to step d, one of the first and second direction buttons of the four-way direction button was pressed twice with the hot button; and g) updating, according to step d, at least one of the first indicia to show the second category and the second indicia to show the second subset.

10. The method of claim 9 wherein step b further comprises displaying a cursor on a thumbnail image of the first subset that is in a first position.

11. The method of claim 10 wherein step e further comprises:

e1) determining if a thumbnail image of the second subset is being displayed in the first position; and e2) displaying, relative to step e1, the cursor on one of a thumbnail image of the second subset that is in the first position and a last thumbnail image of the second subset.

12. The method of claim 10 wherein step f further comprises:

f1) determining if a thumbnail image of the second subcategory's first subset is being displayed in the first position; and f2) displaying, relative to step f1, the cursor on one of a thumbnail image of the second subcategory's first subset that is in the first position and a last thumbnail image of the second subcategory.

* * * * *